(12) United States Patent
Furukawa et al.

(10) Patent No.: US 7,615,302 B2
(45) Date of Patent: Nov. 10, 2009

(54) FUEL CELL PRODUCING METHOD AND APPARATUS

(75) Inventors: Ryuichiro Furukawa, Sayama (JP); Akihiro Usui, Sayama (JP)

(73) Assignee: Honda Motor Co., Ltd., Tokyo (JP)

( * ) Notice: Subject to any disclaimer, the term of this patent is extended or adjusted under 35 U.S.C. 154(b) by 749 days.

(21) Appl. No.: 10/595,937

(22) PCT Filed: Nov. 2, 2004

(86) PCT No.: PCT/JP2004/016624

§ 371 (c)(1),
(2), (4) Date: May 19, 2006

(87) PCT Pub. No.: WO2005/053079

PCT Pub. Date: Jun. 9, 2005

(65) Prior Publication Data

US 2008/0120829 A1    May 29, 2008

(30) Foreign Application Priority Data

Nov. 27, 2003  (JP) ............................ 2003-398052

(51) Int. Cl.
*H01M 8/00* (2006.01)
*B43L 7/00* (2006.01)

(52) U.S. Cl. ............................. 429/34; 429/12; 33/403
(58) Field of Classification Search ................... None
See application file for complete search history.

(56) References Cited

U.S. PATENT DOCUMENTS 6,541,148 B1    4/2003   Walsh et al.

FOREIGN PATENT DOCUMENTS

| EP | 1 349 228 | 10/2003 |
|---|---|---|
| JP | 8-171926 | 7/1996 |
| JP | 2002-246044 | 8/2002 |
| WO | 03/026049 | 3/2003 |

*Primary Examiner*—Patrick Ryan
*Assistant Examiner*—Cynthia Lee
(74) *Attorney, Agent, or Firm*—Rankin, Hill & Clark LLP

(57) ABSTRACT

A method of producing a fuel cell by layering a large number of sheets of unit fuel cells (11). A first supporting plate (14) is placed at the front section of a pusher unit (52) in a slightly inclined, upward facing position, and then a large number of sheets of unit fuel cells are layered on the first supporting plate (14). After that, while making the pusher unit fall into a horizontal position, vibration is applied to the layered unit fuel cells for alignment. A second supporting plate (15) is provided at the front end surface of the aligned unit fuel cells. The first and second supporting plates are connected using connection plates (16, 16) while a predetermined pressing force is applied to the unit fuel cells through the first supporting plate and the second supporting plate.

3 Claims, 19 Drawing Sheets

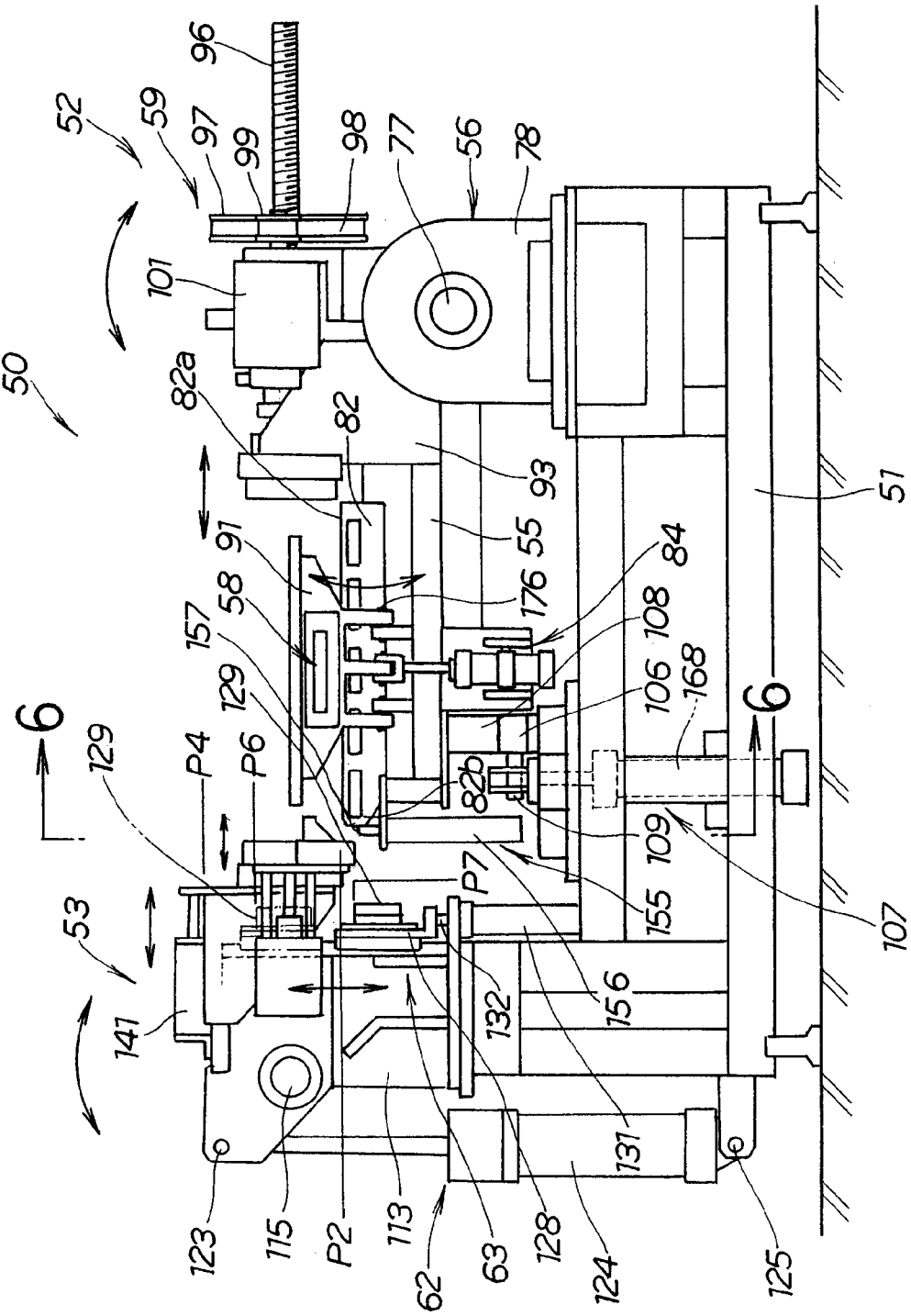

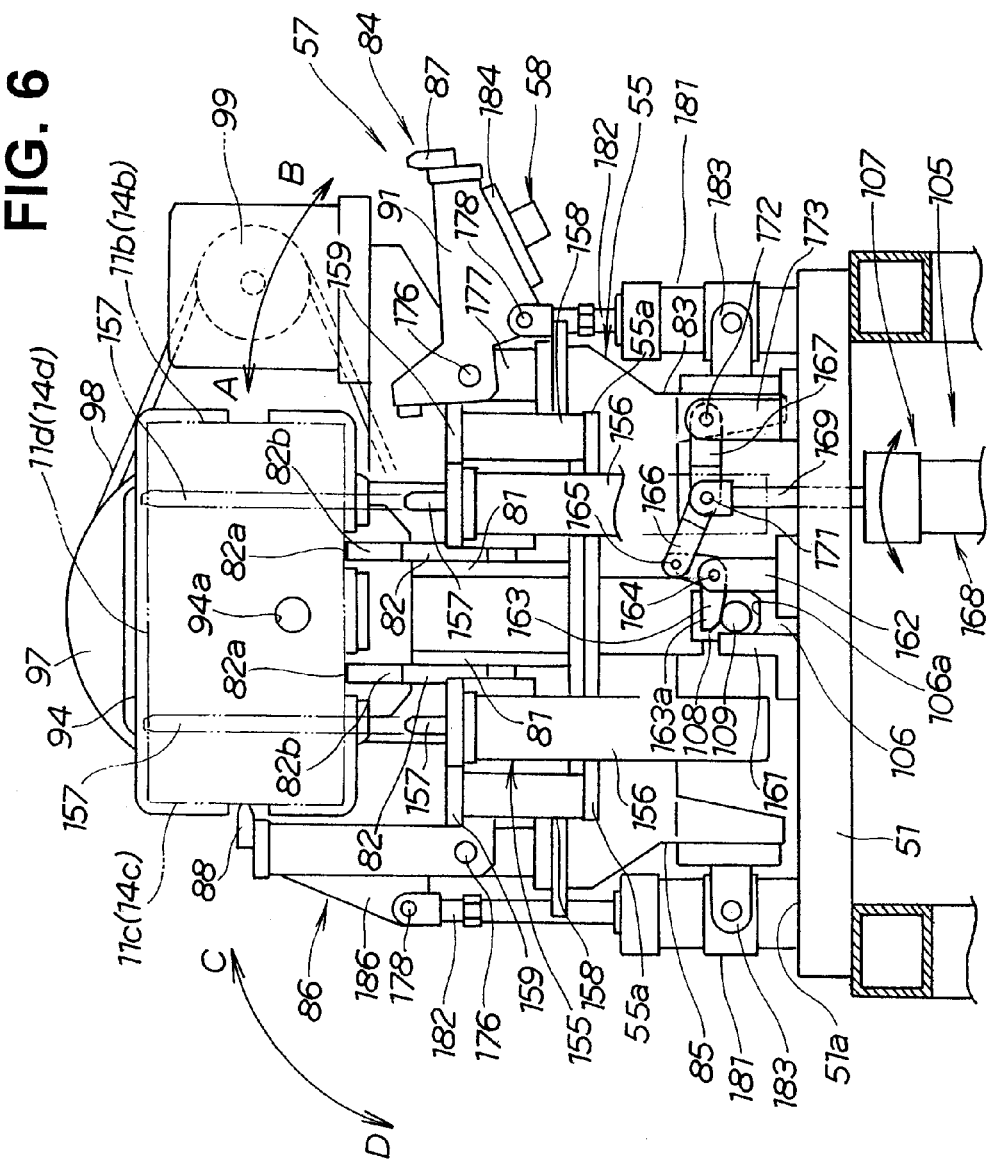

FUEL CELL PRODUCING METHOD AND APPARATUS

TECHNICAL FIELD

This invention relates generally to a fuel cell manufacturing method and apparatus and, more particularly, to a fuel cell manufacturing method and apparatus for manufacturing a fuel cell by manufacturing unit fuel cells by providing positive and negative electrodes on opposite sides of an electrolyte membrane and providing separators on the outer faces of the positive and negative electrodes and then stacking multiple of these unit fuel cells together.

BACKGROUND ART

A manufacturing method of a unit fuel cell (single cell) of a fuel cell is proposed in for example JP-A-2002-246044. This unit fuel cell manufacturing method will be described on the basis of FIG. 19 hereof.

Referring to FIG. 19, a unit fuel cell 300 has a membrane electrode structure 301 formed by providing positive and negative electrodes 303, 304 on the faces of an electrolyte membrane 302. Separators 305, 306 are provided on the faces of this membrane electrode structure 301.

For this unit fuel cell 300 to produce electricity, fuel gas and oxygen gas must be supplied to inside the unit fuel cell 300. To keep the supplied fuel gas and oxygen gas inside the unit fuel cell 300, the periphery of the unit fuel cell 300 must be sealed.

To this end, the electrolyte membrane 302 is made to project outward of the peripheries of the positive and negative electrodes 303, 304, and peripheral parts 308, 309 of the separators 305, 306 are made to face this projecting part 307. Channels 311, 312 are formed in the peripheral parts 308, 309, and liquid seals 313, 313 are deposited in the channels 311, 312.

By the separators 305, 306 with the liquid seals 313, 313 applied being placed on the sides of the membrane electrode structure 301 and the liquid seals 313, 313 being solidified, the gaps 314, 314 between the separators 305, 306 and the electrolyte membrane 302 are sealed.

Many of these unit fuel cells 300 in a stack constitute a fuel cell. That is, a fuel cell has a structure wherein multiple unit fuel cells 300 are stacked to form a stack 316, a first support plate (not shown) is provided on one end of the stack 316, a second support plate (not shown) is provided on the other end of the stack 316, and the stack 316 is held in a pressed state by the first and second support plates being connected together with connection members.

Now, to secure electricity-producing capacity of the fuel cell, it is necessary for the hydrogen gas and oxygen gas necessary for electricity generation to be supplied well and for water produced during electricity generation to be drained well. For this, it is important for gas supply passages 318 for supplying hydrogen gas and oxygen gas and water-draining passages 319 for draining water away to be provided well.

To provide these gas supply passages 318 and water-draining passages 319 in the stack 316, gas supply channels 321 and water-draining channels 322 are pre-formed in the separators 305, 306, and when the separators 305, 306 are stacked the openings of the gas supply channels 321 and the openings of the water-draining channels 322 are closed to make them into flow passages 318, 319.

To secure these gas supply passages 318 and water-draining passages 319 well, when the stack 316 is manufactured, it is necessary for the unit fuel cells 300 to be stacked in a well-aligned state.

Additionally, by the stack 316 being held in a pressed state, the liquid seals 313, 313 of the unit fuel cells 300 are compressed. When the liquid seals 313, 313 are compressed, if the unit fuel cells 300 are not well aligned, it is difficult to apply a uniform pressing force to the liquid seals 313, 313, it is likely that large pressing forces will act locally on the liquid seals 313, 313, and considered from points of view such as that of the durability of the liquid seals 313, 313 this is undesirable.

Accordingly, to apply a uniform pressing force to the liquid seals 313, 313, it is necessary to stack the multiple unit fuel cells 300 in a well-aligned state.

However, the work of stacking the multiple unit fuel cells 300 to make the stack 316 is normally carried out by a worker by hand. Consequently, when stacking the multiple unit fuel cells 300, the worker must handle the individual unit fuel cells 300 carefully, and there is an excessive burden on the worker and this has been a hindrance to raising productivity.

Accordingly, a fuel cell manufacturing method and manufacturing apparatus have been awaited with which it is possible to lighten the burden on the worker and raise productivity.

DISCLOSURE OF THE INVENTION

According to an aspect of the present invention, there is provided a fuel cell manufacturing method for obtaining a fuel cell by manufacturing unit fuel cells, by providing positive and negative electrodes on the sides of an electrolyte membrane and providing separators on the outer faces of these positive and negative electrodes, and stacking together multiple of these unit fuel cells, which method comprises the steps of: loading the multiple unit fuel cells onto a leaning inclined stage in a stacked state; supporting the left and right sides of the stacked multiple unit fuel cells; aligning the multiple unit fuel cells with a vibrating action while lowering the inclined stage to the horizontal; disposing first and second support plates on the end faces of the aligned multiple unit fuel cells; applying a predetermined pressing force to the multiple unit fuel cells by way of the first and second support plates; and connecting together the first and second support plates with connection members while the predetermined pressing force is being applied to the multiple unit fuel cells.

In short, multiple unit fuel cells are loaded onto an inclined stage in a stacked state and the left and right sides of the loaded unit fuel cells are supported. After that, by a vibration being applied to the multiple unit fuel cells while the inclined stage is lowered to the horizontal, the multiple unit fuel cells are brought into alignment. By the multiple unit fuel cells being brought into alignment with a vibrating action like this, it becomes possible for the multiple unit fuel cells to be loaded onto the inclined stage relatively roughly. Consequently, the multiple unit fuel cells can be loaded onto the inclined stage without much labor and in a short time, and an aligned multiple fuel cell stack is obtained. In the manufacture of fuel cells, the burden on workers is lightened and increases in fuel cell productivity can be achieved.

Preferably, in the step of applying a pressing force, as the pressing force applied to the multiple unit fuel cells is raised in stages to the predetermined pressing force, it is raised more gradually, taking more time, as it approaches the predetermined pressing force.

To supply hydrogen gas and oxygen gas to the unit fuel cells, the separators have supply channels for supplying hydrogen gas and oxygen gas. Consequently, if when the predetermined pressing force is applied to the multiple unit fuel cells it is raised to the predetermined pressing force in a short time, it sometimes happens that the pressing force concentrates locally on positive and negative diffusion layers in contact with the separators, and there is a risk of the positive and negative diffusion layers suffering damage.

Additionally, to keep inside the unit fuel cells the hydrogen gas and oxygen gas supplied to inside the unit fuel cells, seals are provided along the peripheries of the unit fuel cells. Consequently, if when the predetermined pressing force is applied to the multiple unit fuel cells it is raised to the predetermined pressing force in a short time, it sometimes happens that the pressing force concentrates locally on the seals, and there is a risk of the seals suffering damage.

To avoid this, in this invention, as mentioned above the pressing force applied to the multiple unit fuel cells is raised to the predetermined pressing force in stages. By this means, when the pressing force is applied to the multiple unit fuel cells, local pressing forces concentrating at the seals is prevented and local pressing forces concentrating at the positive and negative diffusion layers in contact with the separators is prevented.

Also, the pressing force is made to increase more gently as it approaches the predetermined pressing force. By this means, the pressing force concentrating locally at the seals is prevented with certainty, and the pressing force concentrating locally on the positive and negative diffusion layers in contact with the separators is prevented with certainty.

According to another aspect of the present invention, there is provided an apparatus for manufacturing a fuel cell made up of unit fuel cells, made by providing positive and negative electrodes on opposite sides of an electrolyte membrane and providing separators on the outer faces of these positive and negative electrodes, first and second support plates provided on the end faces of a stack of unit fuel cells made by stacking together multiple of the unit fuel cells, and connection members connecting together the first and second support plates, made up of: a pusher beam part swingably mounted on a bed structure, for supporting the first support plate and the multiple unit fuel cells in a stacked state; a pusher beam pivoting part for swinging the pusher beam part between an upward-pointing position in which the stacking of the first support plate and the multiple unit fuel cells is carried out and a horizontal position in which the connecting of the second support plate to the first support plate is carried out; guide means provided along the length direction of the pusher beam part for slidably supporting three sides of the multiple unit fuel cells; vibrating means for applying a vibration to the guide means to align the multiple unit fuel cells supported on the guide means; pusher moving means for moving the first support plate and the multiple unit fuel cells along the guide means; a receiver part, swingably provided facing the pusher beam part, for supporting the second support plate; a receiver pivoting part for swinging the receiver part between an upward-pointing position in which it supports the second support plate and a horizontal position in which the connecting of the second support plate to the first support plate is carried out; and pressing force measuring means for, when the receiver part and the pusher beam part are respectively disposed in their horizontal positions and one end face of the multiple unit fuel cells is pressed against the second support plate with the pusher moving means, measuring the pressing force acting on the second support plate.

Thus, a pusher beam part is provided swingably between an upward-pointing position and a horizontal position. And when the pusher beam part is in its upward-pointing position, a first support plate and multiple unit fuel cells are loaded successively onto the pusher beam part from above. By this means, the multiple unit fuel cells can be loaded onto the first supporting plate easily.

By vibrating means being provided on the guide means, as the pusher beam part moves from its upward-pointing position to its horizontal position, the multiple unit fuel cells are vibrated with the vibrating means and the multiple unit fuel cells are thereby brought into alignment. Because of this, the multiple unit fuel cells can be loaded relatively roughly when they are being stacked.

On the basis of the receiver part being mounted swingably between an upward-pointing position and a horizontal position, the receiver part and the pusher beam part are each disposed in their horizontal position and a second support plate is pressed against the front end face of the multiple unit fuel cells with the pusher moving means.

The pressing force measuring means measures the pressing force acting on the second support plate as the second support plate is being pressed against the front end face of the multiple unit fuel cells with the pusher moving means. By this means it is possible to apply a predetermined pressing force to the multiple unit fuel cells easily and with certainty.

By loading multiple unit fuel cells onto the first supporting plate easily and roughly and applying a predetermined pressing force to the multiple unit fuel cells like this, it is possible to manufacture a fuel cell from multiple unit fuel cells without much labor and in a short time, and productivity increases.

BRIEF DESCRIPTION OF THE DRAWINGS

FIG. 5 is a side view of the manufacturing apparatus shown in FIG. 3;

FIG. 6 is a sectional view on the line 6-6 in FIG. 5;

BEST MODE FOR CARRYING OUT THE INVENTION

Figure 1:
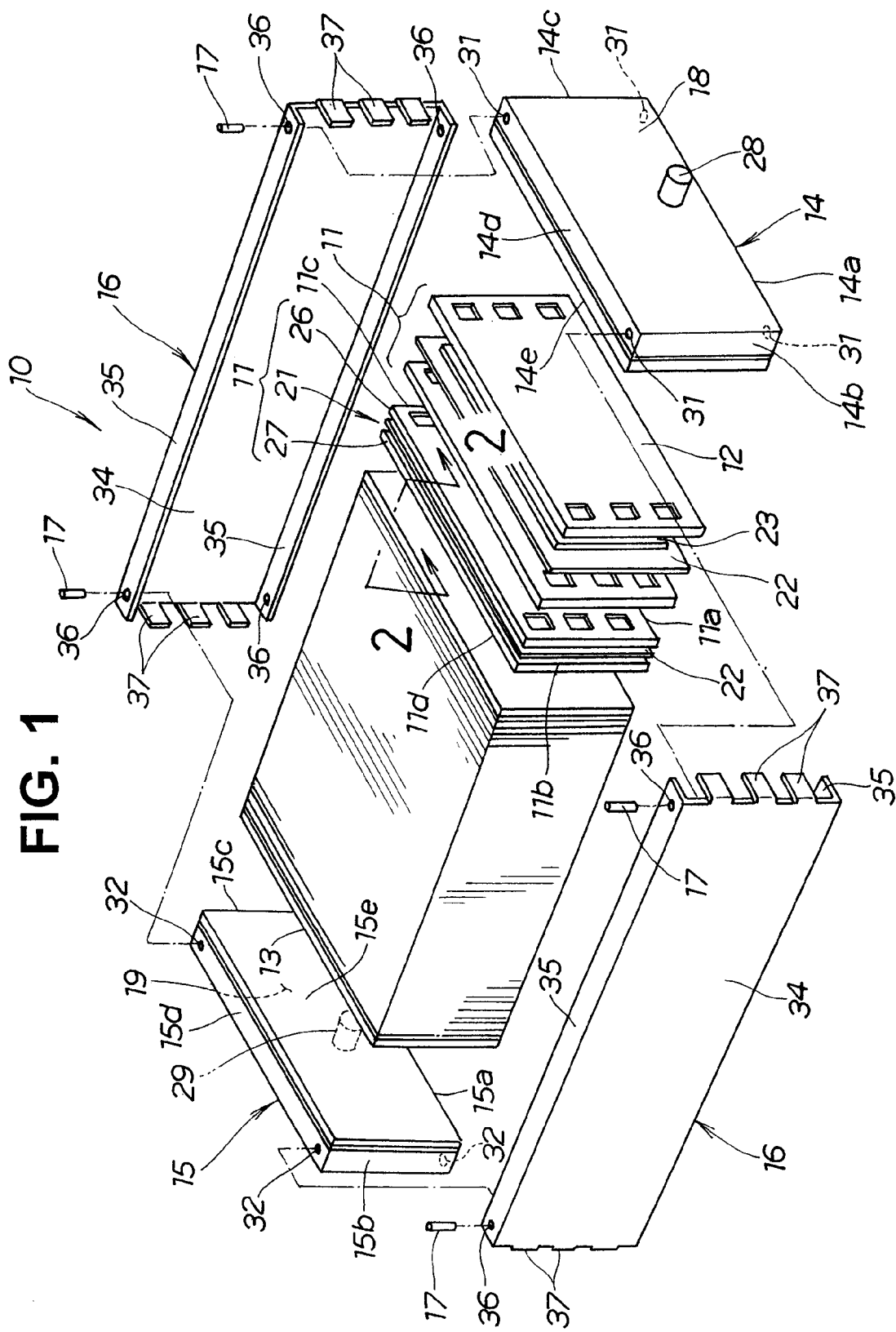
FIG. 1 is an exploded perspective view of a fuel cell assembled by a fuel cell manufacturing apparatus according to the invention.

A fuel cell 10 shown in FIG. 1 has a structure in which multiple unit fuel cells 11 are stacked together, first and second support plates 14, 15 are disposed at the end faces (ends) of the stack of unit fuel cells 11, and left and right connection plates (connection members) 16, 16 are connected to the first and second support plates 14, 15 with a plurality of pins 17 so that the multiple unit fuel cells 11 and the first and second support plates 14, 15 are connected integrally.

Each of the unit fuel cells 11 is made up of a membrane electrode structure 21 formed by providing positive and negative electrodes 23, 24 (for the negative electrode 24 see FIG. 2) on opposite sides of an electrolyte membrane 22, and separators 26, 27 provided on opposite faces of the membrane electrode structure 21.

The first and second support plates 14, 15 have respective connection terminals 28, 29 projecting from obverse faces 18, 19 thereof.

The unit fuel cells 11 are all formed in an approximately rectangular shape with four sides, namely a bottom side 11a, left and right sides 11b, 11c, and a top side 11d.

The first supporting plate 14, like the unit fuel cells 11, is formed in an approximately rectangular shape with four sides, namely a bottom side 14a, left and right sides 14b, 14c, and a top side 14d. The first supporting plate 14 has fixing holes 31, 31 in both ends of its top side 14d. Similarly it has fixing holes 31, 31 in both ends of its bottom side 14a.

The second support plate 15, like the first supporting plate 14, is formed in an approximately rectangular shape with four sides, namely a bottom side 15a, left and right sides 15b, 15c and a top side 15d. The second support plate 15 has fixing holes 32, 32 in both ends of its top side 15d. Similarly it has fixing holes 32, 32 in both ends of its bottom side 15a.

A side wall 34 of each of the left and right connection plates 16 is formed in an approximately rectangular shape. A pair of bent-over portions 35, 35 is formed at the top and bottom sides of this side wall 34. Fixing holes 36, 36 are formed in the ends (front and rear ends) of the upper bent-over portion 35, and fixing holes 36, 36 are also formed in the ends of the lower bent-over portion 35. A plurality of retaining portions 37, 37 are formed at each of the ends (front and rear ends) of the side wall 34.

The top and bottom bent-over portions 35, 35 are fitted over the multiple unit fuel cells 11 and the first and second support plates 14, 15, the multiple fixing holes 36, 36 formed in these bent-over portions 35, 35 are aligned with the fixing holes 31, 31, 32, 32 in the first and second support plates 14, 15, and the pins 17 are inserted into the fixing holes 36, 31 and inserted into the fixing holes 36, 32. In this way the first and second support plates 14, 15 are connected to the left and right connection plates 16.

By the first and second support plates 14, 15 being connected to the left and right connection plates 16, 16 like this, the fuel cell 10 is assembled.

In this assembled state, the multiple retaining portions 37 abut with the obverse faces 18, 19 of the first and second support plates 14, 15.

Figure 2:
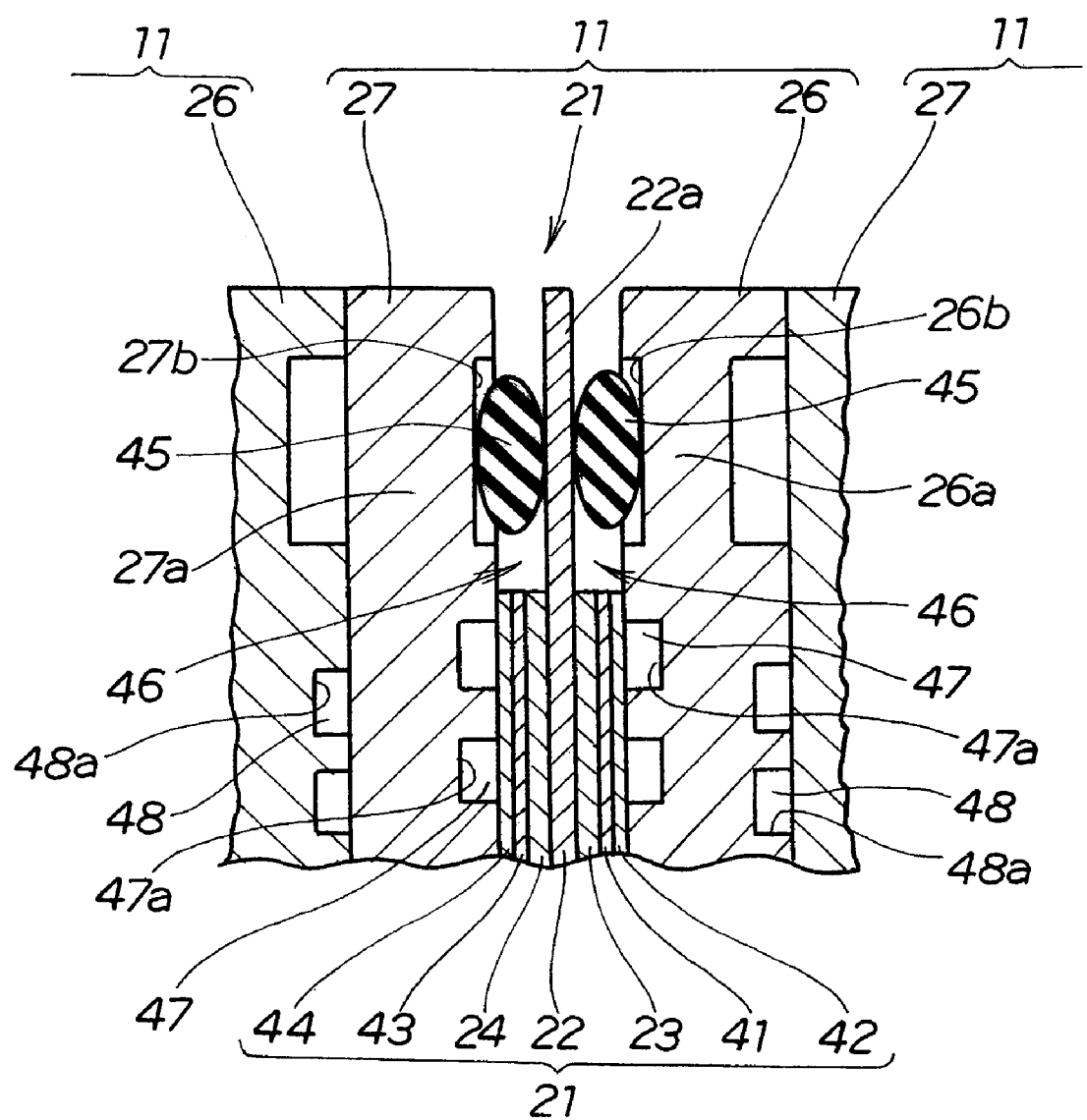
FIG. 2 is a sectional view on the line 2-2 in FIG. 1.

A unit fuel cell 11 shown in FIG. 2 is made up of a membrane electrode structure 21, made by providing positive and negative electrodes 23, 24 on opposite sides of an electrolyte membrane 22, providing a positive electrode side backing layer 41 and diffusion layer 42 on the outer side of the positive electrode 23, and providing a negative electrode side backing layer 43 and diffusion layer 44 on the outer side of the negative electrode 24, and separators 26, 27 provided on opposite sides of this membrane electrode structure 21. For the diffusion layers 42, 44, for example porous carbon paper is used.

The electrolyte membrane 22 projects outward of the peripheries of the positive and negative electrodes 23, 24, and this projecting part 22a is faced by peripheral parts 26a, 27a of the separators 26, 27. Gutters 26b, 27b for liquid seals 45 to be deposited in are formed in the peripheral parts 26a, 27a of the separators 26, 27.

The liquid seals 45, 45 are deposited in the gutters 26b, 27b, and then by the separators 26, 27 being placed on the sides of the membrane electrode structure 21 and the liquid seals 45, 45 being solidified, the gaps 46, 46 between the separators 26, 27 and the electrolyte membrane 22 are closed.

Also, as a result of the separators 26, 27 being disposed on the sides of the membrane electrode structure 21, the open sides of gas supply channels 47a formed in the separators 26, 27 are closed to form flow passages 47.

By adjacent unit fuel cells 11 being stacked together, the open sides of water discharge channels 48a formed in the separator 26 are closed to form flow passages 48.

To make the unit fuel cell 11 produce electricity, fuel gas and oxygen gas are supplied into the unit fuel cell 11 through the flow passages 47, and water produced is drained through the flow passages 48.

Here, because the periphery of the unit fuel cell 11 is sealed by the liquid seals 45, when the fuel gas and oxygen gas are supplied into the unit fuel cell 11, these gases are kept inside the unit fuel cell 11 well without leaking.

A fuel cell manufacturing apparatus for assembling a fuel cell 10 made by stacking multiple unit fuel cells 11, disposing approximately rectangular first and second support plates 14, 15 (see FIG. 1) on the end faces 12, 13 of this stack of unit fuel cells 11 and connecting the first and second support plates 14, 15 together with left and right connection plates 16, 16 will now be described on the basis of FIG. 3 to FIG. 6.

Figure 3:
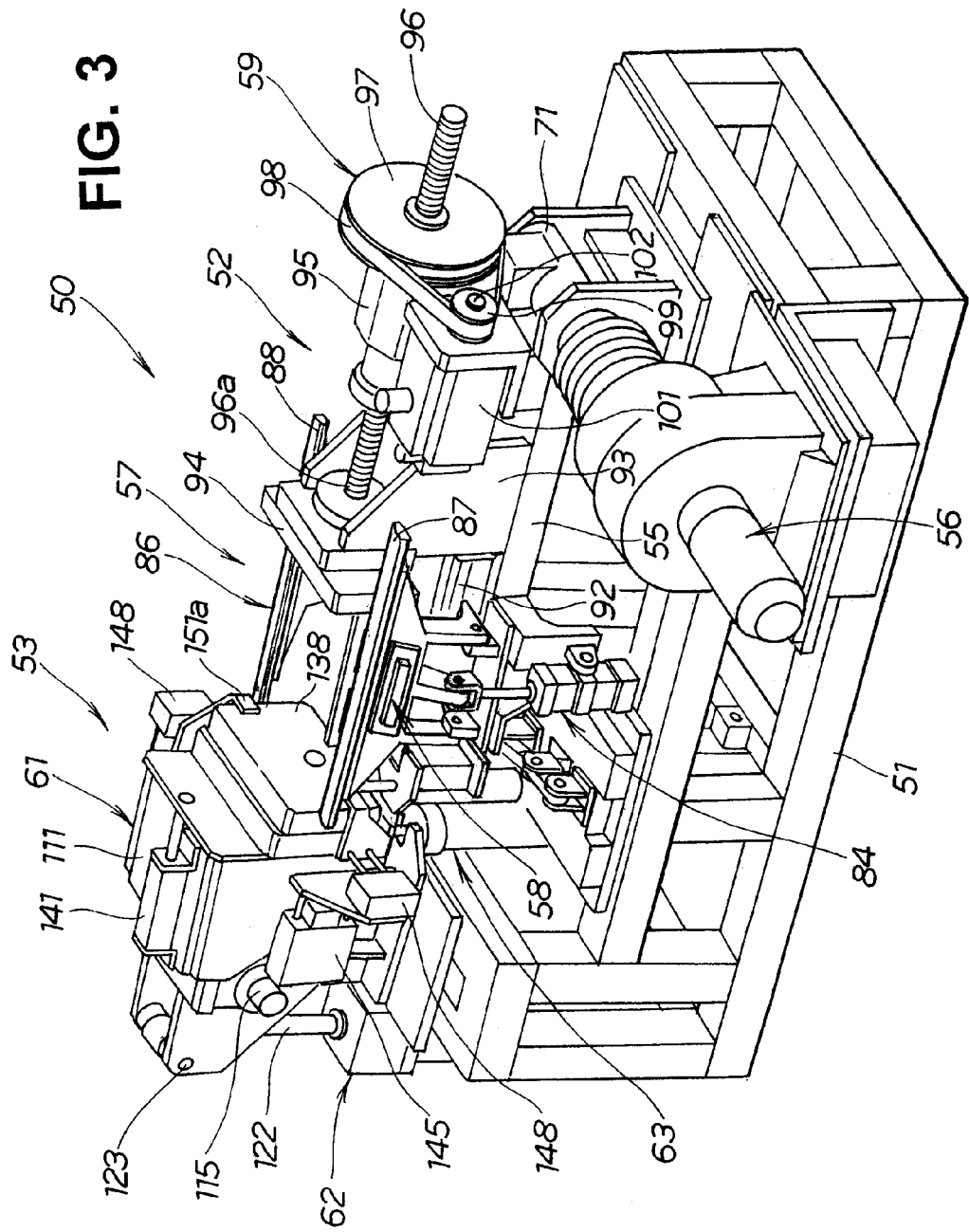
FIG. 3 is a perspective view showing a fuel cell manufacturing apparatus according to the invention.

Referring to FIG. 3, a fuel cell manufacturing apparatus 50 has a pusher unit 52 on the rear side (the right side in the figure) of a bed structure 51 and a receiver unit 53 on the front side (the left side in the figure) of the bed structure 51.

The pusher unit 52 is pivotable between an upward-pointing position P1 (see FIG. 7B) in which the first supporting plate 14 and multiple unit fuel cells 11 shown in FIG. 1 can be stacked upon it on top of each other and a horizontal position P2 (see FIG. 5 and FIG. 7A) in which the stack direction of the stacked first supporting plate 14 and multiple unit fuel cells 11 is horizontal. The horizontal position P2 shows the direction in which the second support plate 15 (see FIG. 1) is connected to the first supporting plate 14.

Figure 7A:
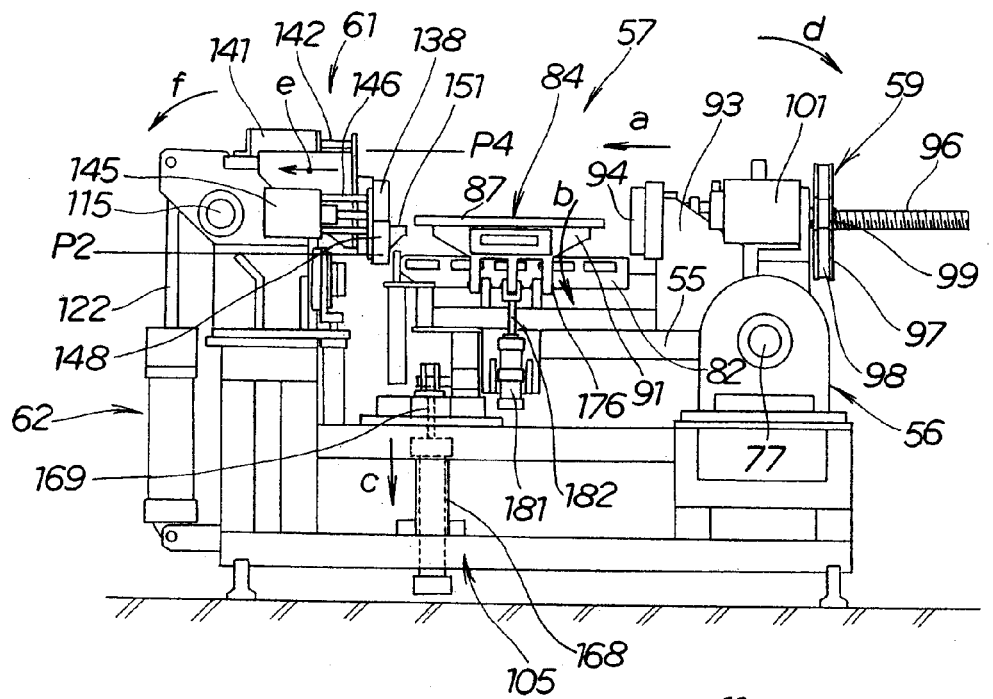
FIG. 7A and FIG. 7B are views showing a step of loading multiple unit fuel cells onto an inclined stage in a stacked state in a fuel cell manufacturing method according to the invention.
Figure 7B:
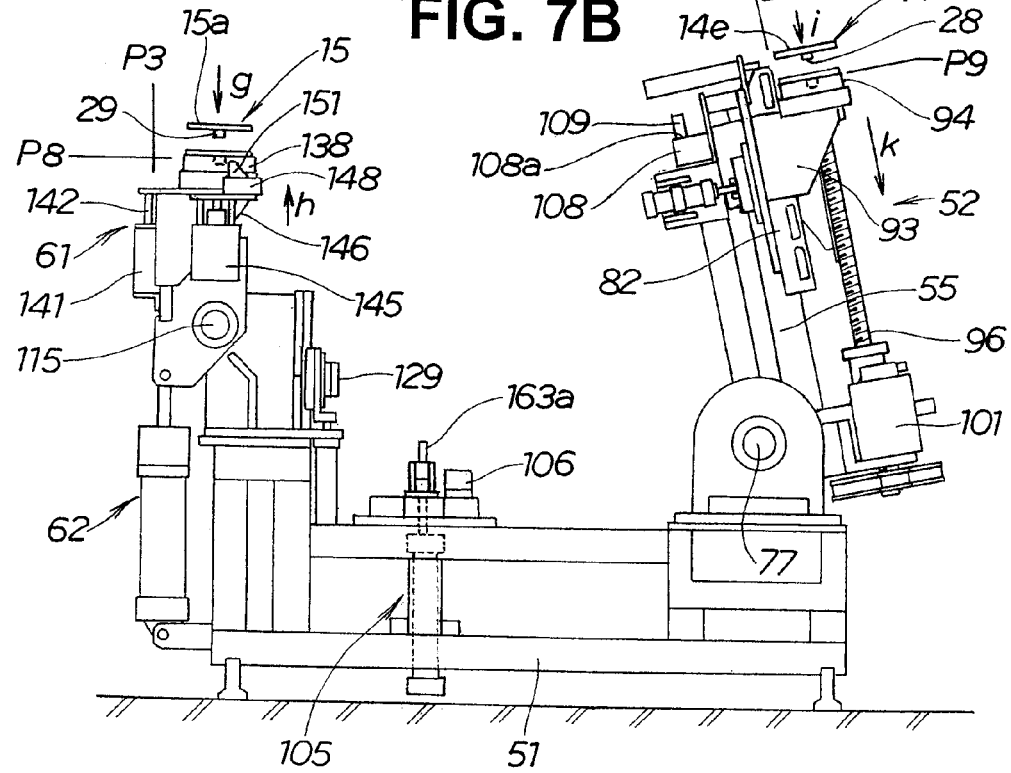

The receiver unit 53 is pivotable between an upward-pointing position P3 (see FIG. 7(b)) in which it can support a second support plate 15 (see FIG. 1) in the vertical direction and a horizontal position P4 (see FIG. 5, FIG. 7(a)) in which the second support plate 15 faces the front end face 13 (see FIG. 1 and FIG. 13) of a stack of multiple unit fuel cells 11 disposed in the horizontal position P2. The horizontal position P4 shows the direction in which the second support plate 15 is connected to the first supporting plate 14.

Figure 4:
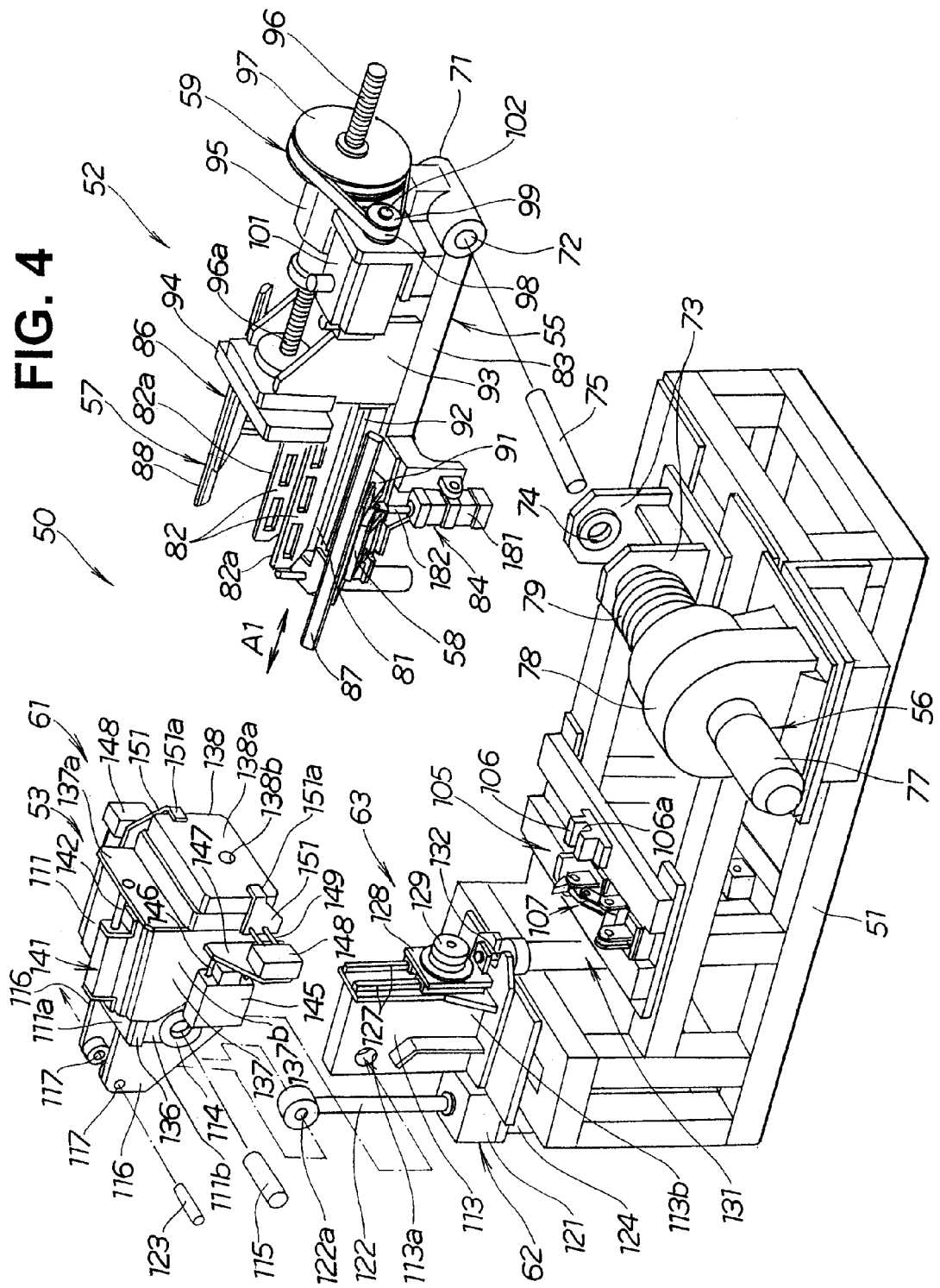
FIG. 4 is an exploded perspective view of the manufacturing apparatus shown in FIG. 3.

As shown in FIG. 3 and FIG. 4, the pusher unit 52 has a beam-like pusher beam part 55, a pusher beam pivoting part 56, guide means 57, vibrating means 58, and pusher moving means 59.

The pusher beam part 55 is provided swingably with respect to the bed structure 51 so that it can support a first supporting plate 14 and multiple unit fuel cells 11 in a stacked state.

The pusher beam pivoting part 56 swings the pusher beam part 55 between two positions, the up-down direction upward-pointing position P1 for stacking the first supporting plate 14 and multiple unit fuel cells 11, and the horizontal position P2.

The guide means 57 is provided alongside the pusher beam part 55 and slidably supports three sides of the first supporting plate 14 (the bottom side 14a and the left and right sides 14b, 14c) and three sides of the multiple unit fuel cells 11 (the bottom side ha and the left and right sides 11b, 11c) shown in FIG. 1, and guides the first supporting plate 14 and the stacked multiple unit fuel cells 11 in the direction of the receiver unit 53.

The vibrating means 58 imparts a vibration to the guide means 57 to align the first supporting plate 14 and multiple unit fuel cells 11 supported by the guide means 57.

The pusher moving means 59 moves the first supporting plate 14 and multiple unit fuel cells 11 along the guide means 57 in the direction of the receiver unit 53.

The receiver unit 53 has a receiver part 61, a receiver pivoting part 62 and pressing force measuring means 63.

The receiver part 61 is swingably mounted on the bed structure 51, facing the pusher beam part 55, to support the second support plate 15 shown in FIG. 1.

The receiver pivoting part 62 swings the receiver part 61 between two positions, the upward-pointing position P3, in which it supports the second support plate 15, and the horizontal position P4, in which the second support plate 15 faces the front end face 13 of the multiple unit fuel cells 11.

The pressing force measuring means 63 measures a pressing force F (see FIG. 15A) acting on the second support plate 15 when the pusher beam part 55 and the receiver part 61 are disposed in their respective horizontal positions P2, P4 and the front end face 13 of the multiple unit fuel cells 11 (see FIG. 1, FIG. 13) is pressed against the second support plate 15 by the pusher moving means 59.

This fuel cell manufacturing apparatus will now be described in detail on the basis of FIG. 4, in which it is shown in perspective view.

Referring to FIG. 4, the pusher beam part 55 of the pusher unit 52 is a beam-like member extending in a straight line. The pusher beam part 55 has a through hole 72 formed in a base end part 71 thereof. This base end part 71 is mounted between mounting brackets 73, 73 provided on the bed structure 51. At the time of this mounting, the through hole 72 in the base end part 71 is aligned with mounting holes 74, 74 (of which the nearer mounting hole 74 is not shown in the figure) formed in the mounting brackets 73, and a shaft 75 is then passed through the mounting holes 74, 74 and the through hole 72. And by the shaft 75 thus fitted being connected to the pusher beam pivoting part 56, the pusher beam part 55 is connected by its base end part 71 to the pusher beam pivoting part 56.

The pusher beam pivoting part 56 has a drive motor 77 and a speed-reducer 78 attached to this drive motor 77. The speed-reducer 78 is mounted on the bed structure 51. The output shaft (not shown) of the speed-reducer 78 is connected to the shaft 75.

By the drive motor 77 being driven, the pusher beam part 55 is swung between the upward-pointing position P1 and the horizontal position P2 (see FIG. 7A and FIG. 7B).

A spring 79 for acting to offset the weight of the pusher unit 52 is provided between the speed-reducer 78 and the mounting brackets 73.

The guide means 57 provided on the pusher beam part 55 has lower guide plates 82, 82 provided on side walls 81, 81 (see also FIG. 6) of the pusher beam part 55, a left guide part 84 provided on a left outside wall 83 of the pusher beam part 55, and a right guide part 86 provided on a right outside wall 85 (see FIG. 6) of the pusher beam part 55. Top sides 82a, 82a of the pair of lower guide plates 82, 82 project upward of the side walls 81, 81 of the pusher beam part 55.

The bottom side 14a of the first supporting plate 14 and the bottom sides 11a of the multiple unit fuel cells 11 shown in FIG. 1 are supported by the pair of lower guide plates 82, 82. The left side 14b of the first supporting plate 14 and the left sides 11b of the multiple unit fuel cells 11 are supported by a left guide plate 87 of the left guide part 84.

Also, the right side 14c of the first supporting plate 14 and the right sides 11c of the multiple unit fuel cells 11 shown in FIG. 1 are supported by a right guide plate 88 of the right guide part 86.

The vibrating means 58 is provided on the left guide part 84. This vibrating means 58 is provided on a left oscillating part 91 of the left guide part 84 and by vibrating in the front-rear direction as shown by the arrow A1 imparts a vibration to the first supporting plate 14 and multiple unit fuel cells 11 shown in FIG. 1 and thereby brings them into alignment. The vibrating means 58 for example has a vibrating body vibrated using an electromagnetic coil; however, the construction of the vibrating means 58 is not limited to this.

The pusher moving means 59 is provided on the base end part 71 end of the pusher beam part 55. This pusher moving means 59 has slide guides 92, 92 (of which the right side slide guide 92 is not shown) mounted on the left and right of the pusher beam part 55; a moving body 93 slidably mounted on the left and right slide guides 92, 92; a holding part 94, mounted on the front end of this moving body 93, for holding the first supporting plate 14 shown in FIG. 1; a ball screw 96 mounted on via support part 95 to the rear of the moving body 93; a large-diameter pulley 97 attached to this ball screw 96; a small-diameter pulley 99 connected to this large-diameter pulley 97 by a belt 98; and a drive motor 101 having this small-diameter pulley 99 attached to its drive shaft 102.

The moving body 93 is rotatably connected to a front end part 96a of the ball screw 96.

When the drive motor 101 is driven to rotate forward, the ball screw 96 is rotated forward via the small-diameter pulley 99, the belt 98 and the large-diameter pulley 97, and the moving body 93 moves forward along the pusher beam part 55 and specifically along the guide means 57.

When the drive motor 101 is driven to rotate backward, the ball screw 96 is rotated backward via the small-diameter pulley 99, the belt 98 and the large-diameter pulley 97, and the moving body 93 moves backward along the pusher beam part 55 and specifically along the guide means 57.

The bed structure 51 has pusher unit locking means 105 for holding the pusher unit 52 in its horizontal position P2 (see FIG. 5, FIG. 7A).

The pusher unit locking means 105 has a receiving part 106 provided on the bed structure 51 and a locking part 107 in front of this receiving part 106.

By a positioning projection 108 (see FIG. 6, FIG. 7B) being inserted into a slot 106a formed in the receiving part 106, the pusher unit 52 is positioned in the horizontal position P2 (see FIG. 5, FIG. 7A).

The positioning projection 108 projects downward from the underside of the distal end of the pusher beam part 55 as shown in FIG. 7B.

By the locking part 107 retaining a lock pin 109 (see FIG. 5 and FIG. 6), the pusher unit 52 is held in its positioned state in the horizontal position P2. The lock pin 109 projects forward from the front end 108a of the positioning projection 108 as shown in FIG. 7B.

The receiver part 61 of the receiver unit 53 has a receiver proper 111. A rear part 111a of the receiver proper 111 has an inverted U shape in cross-section. Mounting holes 114, 114 (of which the one on the far side is not shown) are formed in the side walls of this rear part 111a.

A bracket 113 of the bed structure 51 is fitted in the downward-facing opening of the rear part 111a of the receiver proper 111, the left and right mounting holes 114, 114 are aligned with a mounting hole 113a in the bracket 113, and a mounting pin 115 is passed through these mounting holes 114, 113a. By this means the receiver proper 111, that is, the receiver part 61, is swingably supported on the bracket 113 of the bed structure 51.

Mounting holes 117, 117 are formed in left and right brackets 116, 116 constituting the rear part of the receiver proper 111. The mounting holes 117, 117 are aligned with a mounting hole 122a formed in the top end of a cylinder rod 122 of the receiver pivoting part 62, a mounting pin 123 is passed through these mounting holes 117, 122a, and the cylinder rod 122 is thereby connected to the left and right brackets 116, 116.

As the receiver pivoting part 62, for example a pivoting cylinder 121 is used. A cylinder proper 124 is mounted to the bed structure 51 at its bottom end by way of a mounting pin 125 (see FIG. 5).

When the cylinder rod 122 of the receiver pivoting part 62 is retracted, the receiver part 61 moves to its upward-pointing position P3 (see FIG. 7B) to support a second support plate 15.

When the cylinder rod 122 of the receiver pivoting part 62 is advanced, the receiver part 61 moves to its horizontal position P4 (see FIG. 5) in which the second support plate 15 shown in FIG. 1 faces the front end face 13 of the multiple unit fuel cells 11.

The pressing force measuring means 63 is provided on a front part 113b of the bracket 113 mounted on the bed structure 51. This pressing force measuring means 63 is provided movably in the vertical direction on an ascending/descending body 128 on slide guides 127, 127 provided extending vertically on the front part 113b of the bracket 113 of the bed structure 51. A load cell 129 is mounted on the ascending/descending body 128. The ascending/descending body 128 is connected to a cylinder rod 132 of a lifting cylinder 131. The lifting cylinder 131 is connected to the bed structure 51.

Figure 13:
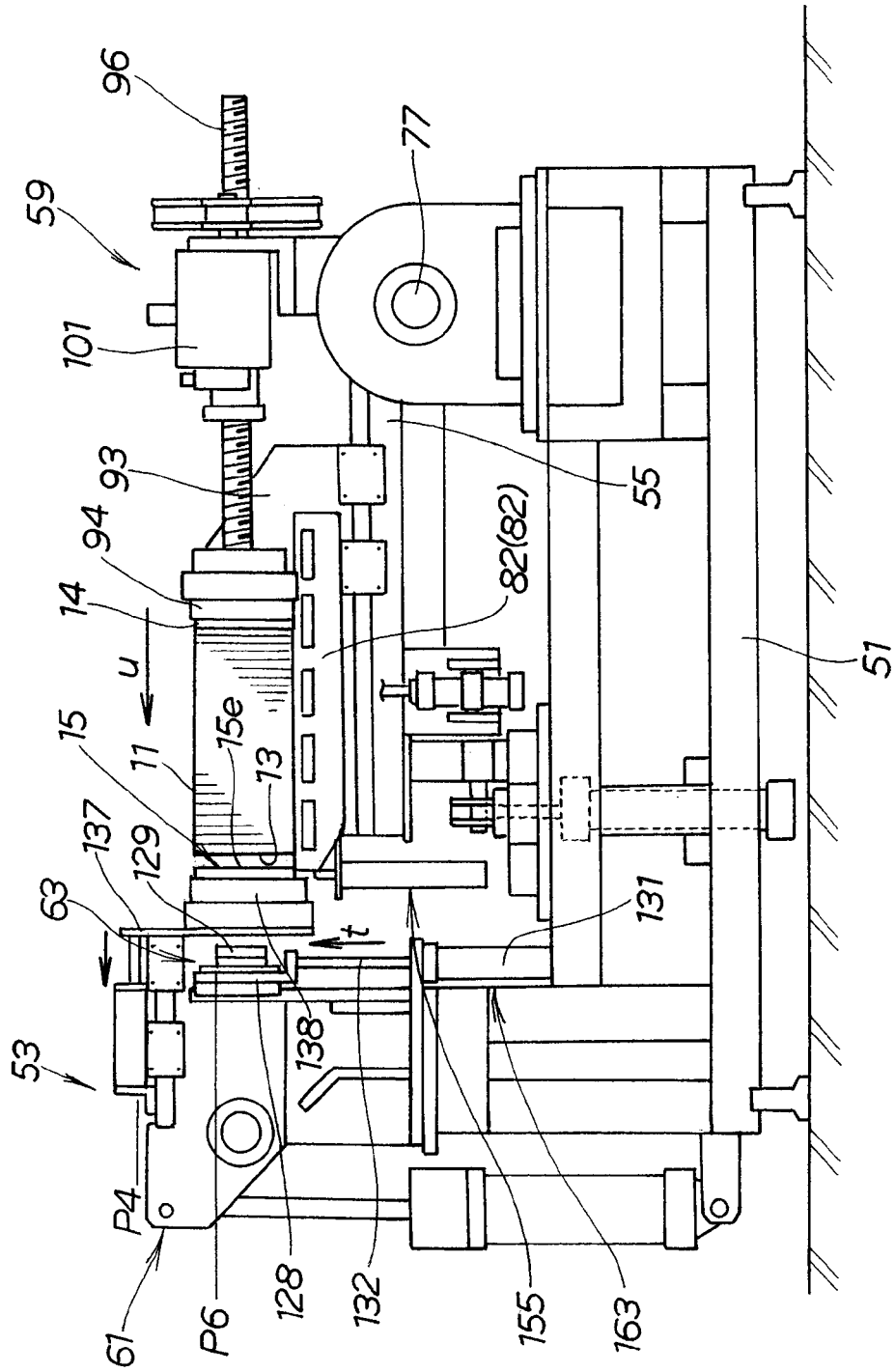
FIG. 13 is a view showing a step of disposing a load cell in a measuring position.

When the cylinder rod 132 of the lifting cylinder 131 advances, together with the ascending/descending body 128 the load cell 129 ascends as far as a measurement position P6 (see FIG. 5, FIG. 13). When the load cell 129 is positioned in the measurement position P6, a pressing force acting on the second support plate 15 is measured.

When the cylinder rod 132 of the lifting cylinder 131 retracts, together with the ascending/descending body 128 the load cell 129 descends to a withdrawn position P7 (see FIG. 5).

The receiver part 61 has the receiver proper 111, slide guides 136, 136 (of which the one on the far side is not shown) mounted on left and right side walls 111b, 111b (of which the one on the far side is not shown) of the receiver proper 111, a moving body 137 mounted movably in the front-rear direction on the left and right slide guides 136, 136, a holding part 138 mounted on the front end of this moving body 137 for holding a second support plate 15 (see FIG. 1), and a moving cylinder 141 mounted on a top face of the receiver proper 111 and having a cylinder rod 142 with its distal end connected to a front end top part 137a of the moving body 137.

When the cylinder rod 142 of the moving cylinder 141 advances, the moving body 137 (that is, the holding part 138) moves to a setting position P8 (see FIG. 7B) for setting a second support plate 15.

When the moving cylinder 141 is free, as the second support plate 15 (see FIG. 1) is pushed rearward, the holding part 138 moves rearward and the second support plate 15 abuts with the load cell 129 positioned in the measurement position P6 shown in FIG. 5 and FIG. 13.

The receiver part 61 also has first holding cylinders 145, 145 (of which the first holding cylinder 145 on the far side is not shown) mounted on the left and right wall parts 137b, 137b (of which the wall part 137b on the far side is not shown) of the moving body 137, brackets 147, 147 (of which the bracket 147 on the far side is not shown) mounted on the ends of cylinder rods 146, 146 of the left and right first holding cylinders 145, 145, second holding cylinders 148, 148 mounted on the left and right brackets 147, 147, and left and right retaining claws 151, 151 mounted on cylinder rods 149, 149 (of which the cylinder rod 149 on the far side is not shown) of the left and right second holding cylinders 148, 148.

The left and right retaining claws 151, 151 are each disposed oriented in the front-rear direction, and their distal ends have bent-over portions 151a, 151a bent over along a front face 138a of the holding part 138.

By the left and right bent-over portions 151a, 151a making contact with a rear face 15e (see FIG. 1) of a second support plate 15, the holding part 138 holds the second support plate 15.

When the cylinder rods 146, 146 of the left and right first holding cylinders 145, 145 advance, the left and right retaining claws 151, 151 advance.

When the cylinder rods 146, 146 of the left and right first holding cylinders 145, 145 retract, the left and right retaining claws 151, 151 retract.

When the cylinder rods 149, 149 of the left and right second holding cylinders 148, 148 advance, the left and right retaining claws 151, 151 move toward each other, i.e. toward the side faces of the holding part 138.

And when the cylinder rods 149, 149 of the left and right second holding cylinders 148, 148 retract, the left and right retaining claws 151, 151 move away from the side faces of the holding part 138.

In this way, by operating the left and right first holding cylinders 145, 145 and the left and right second holding cylinders 148, 148 it is possible to bring the bent-over portions 151a, 151a of the left and right retaining claws 151, 151 into contact with the rear face 15e of the second support plate 15.

The holding part 138 supporting the second support plate 15 has a recess 138b formed in its front face 138a. This recess 138b accommodates a connection terminal 29 of the second support plate 15 (see FIG. 1).

As shown in FIG. 5, by the cylinder rod 132 of the lifting cylinder 131 of the pressing force measuring means 63 advancing, the ascending/descending cylinder 128 and the load cell 129 (shown with dashed lines) are lifted to the measurement position P6 (see also FIG. 13). And as a result of the load cell 129 being positioned in the measurement position P6, it becomes possible to measure a pressing force F acting on the second support plate 15 (see FIG. 1).

When the cylinder rod 132 of the lifting cylinder 131 retracts, the ascending/descending cylinder 128 and the load cell 129 (shown with solid lines) descend to the withdrawn position P7.

The pusher unit 52 has fall prevention means 155 mounted on the distal end of the pusher beam part 55. This fall prevention means 155 has left and right fall prevention cylinders 156, 156 and cylinder rods 157, 157 positioned at the distal ends 82b, 82b of the left and right lower guide plates 82, 82, shown in FIG. 6.

The cylinder rods 157, 157 can project upward of the top sides 82a, 82a of the left and right lower guide plates 82, 82 as shown with double-dotted lines in FIG. 6.

By the positioning projection 108 of the pusher beam part 55 fitting in the receiving part 106 provided on the bed structure 51, the pusher unit 52 is positioned in the horizontal position P2.

Also, by the lock pin 109 provided on the positioning projection 108 being retained by the locking part 107, the pusher unit 52 is held in the horizontal position P2.

The vibrating means 58 mounted on the left guide part 84 vibrates the left oscillating part 91 in the front-rear direction (a horizontal direction), and this vibration is transmitted to the first supporting plate 14 and the stacked multiple unit fuel cells 11 shown in FIG. 1.

As shown in FIG. 6 the pusher beam part 55 has left and right leg parts 158, 158 attached to its left right distal ends 55a, 55a. The left and right fall prevention cylinders 156, 156 are mounted in the vertical direction on brackets 159, 159 provided on the top ends of the left and right leg parts 158, 158.

When the cylinder rods 157, 157 of the left and right fall prevention cylinders 156, 156 advance, the distal ends of the cylinder rods 157, 157 project upward of the top sides 82a, 82a of the left and right lower guide plates 82, 82 as shown with imaginary lines. Consequently, the multiple unit fuel cells 11 (see FIG. 1, FIG. 8) loaded onto the top sides 82a, 82a of the left and right lower guide plates 82, 82 are prevented from falling off.

The locking part 107 of the pusher unit locking means 105 mounted on the bed structure 51 has a guide member 161, an L-shaped retaining member 163, a first link 166 and a second link 167.

The guide member 161 is mounted on an upper face 51a of the bed structure 51 so as to be positioned on the right side of the lock pin 109 (the left side in FIG. 6). A first support bracket 162 is mounted on the left side of the lock pin 109.

The retaining member 163 is pivotally mounted on the first support bracket 162 by way of a pin 164.

One end of the first link 166 is pivotally connected to the retaining member 163 by way of a pin 165, and the other end is pivotally connected to the end of a cylinder rod 169 by way of a pin 171.

One end of the second link 167 is pivotally connected to the end of the cylinder rod 169 by way of the pin 171, and the other end is pivotally connected to a second support bracket 173 by way of a pin 172. This second support bracket 173 is mounted on the upper face 51a of the bed structure 51.

A locking cylinder 168 to which the cylinder rod 169 belongs is supported on the bed structure 51 swingably in the left-right direction as shown with an arrow.

Figure 11A:
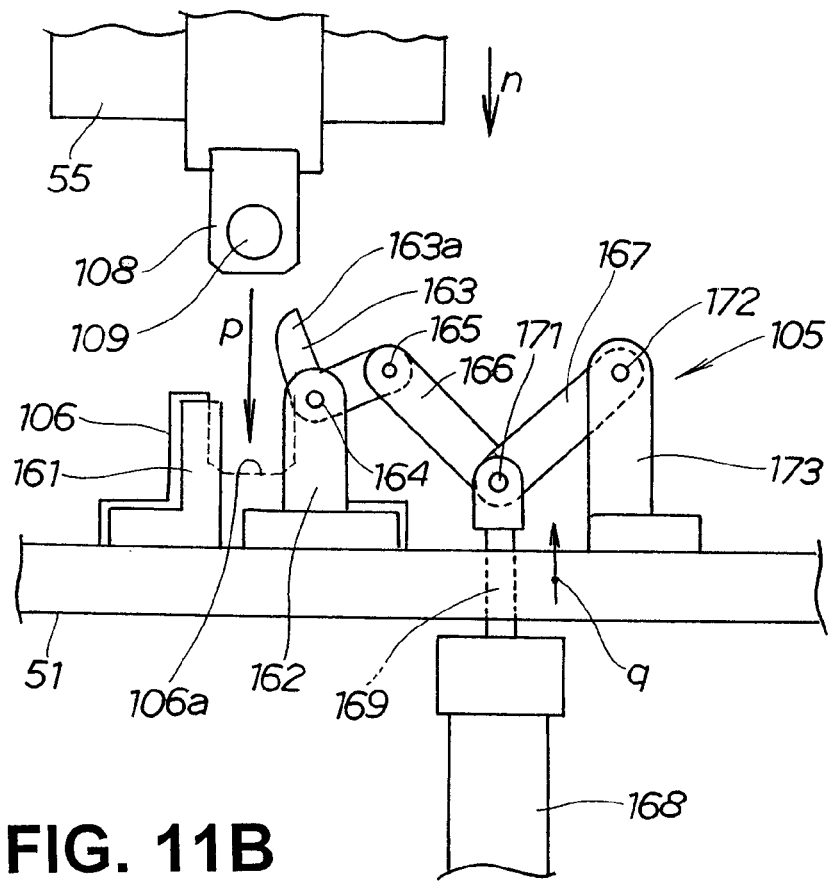
FIG. 11A and FIG. 11B are views showing a step of locking a pusher unit in a horizontal position.

In this locking part 107, when the cylinder rod 169 of the locking cylinder 168 retracts from the position shown in the figure, the retaining member 163 pivots in the clockwise direction and a retaining portion 163a of the retaining member 163, that is, the distal end of the retaining member 163, moves away from the upper face of the lock pin 109 to a withdrawn position (see FIG. 11A). By this means, the locked state of the lock pin 109 is released.

On the other hand, when the cylinder rod 169 of the locking cylinder 168 advances to the position shown in the figure, the retaining member 163 pivots in the counterclockwise direction and the retaining portion 163a of the retaining member 163 moves to a locking position on the upper face of the lock pin 109. By this means, the lock pin 109 is locked.

The left guide part 84 of the guide means 57 has a left rocking part 91, a guide cylinder 181, and a left guide plate mounted on the top of the left rocking part.

The left rocking part 91 is mounted rockably on a support part 177 by way of a pin 176. The support part 177 is fixed to the left side of the pusher beam part 55.

The end of the cylinder rod 182 of the guide cylinder 181 is connected to the bottom of the left rocking part 91 by way of a pin 178. The guide cylinder 181 is mounted rockably in the left-right direction by way of a pin on a bracket 183 mounted on the left outside wall 83 of the pusher beam part 55.

The vibrating means 58 is mounted on a sloping lower face of the left rocking part 91 by way of a mounting plate 184.

In the left guide part 84, when the cylinder rod 182 of the guide cylinder 181 advances, the left rocking part 91 rocks upward about the pin 176 as shown by the arrow A. Consequently, the left guide plate 87 assumes a horizontal support position and supports the left side 14b of the first supporting plate 14 and the left sides 11b of the multiple unit fuel cells 11 shown in FIG. 1.

When the cylinder rod 182 of the guide cylinder 181 retracts, the left rocking part 91 rocks downward about the pin 176 as shown by the arrow B. Consequently, the left guide plate 87 assumes a vertical, withdrawn position (the position shown in the figure), clear of the left side 14b of the first supporting plate 14 and the left sides 11b of the multiple unit fuel cells 11 shown in FIG. 1.

The right guide part 86 of the guide means 57 has a right rocking part 186 corresponding to the left rocking part 91 of the left guide part 84, and the rest of its construction is the same as the left guide part 84.

The right rocking part 186 has the construction of the left rocking part 91 without the vibrating means 58.

In the right guide part 86, when the cylinder rod 182 of the guide cylinder 181 advances, the right rocking part 186 rocks upward about the pin 176 as shown by the arrow C. Consequently, the right guide plate 88 assumes a horizontal support position (the position shown in the figure) and supports the right side 14c of the first supporting plate 14 and the right sides 11c of the multiple unit fuel cells 11 shown in FIG. 1.

When the cylinder rod 182 of the guide cylinder 181 retracts, the right rocking part 186 rocks downward about the pin 176 as shown by the arrow D. Consequently, the right guide plate 88 assumes a vertical, withdrawn position, clear of the right side 14c of the first supporting plate 14 and the right sides 11c of the multiple unit fuel cells 11 shown in FIG. 1.

The holding part 94 supporting the first supporting plate 14 has a recess 94a formed in its approximate center. The recess 94a accommodates the terminal 28 of the first supporting plate 14 (see FIG. 1).

Next, a method for manufacturing a fuel cell using a fuel cell manufacturing apparatus according to this preferred embodiment will be described, on the basis of FIG. 7A to FIG. 18.

FIG. 7A and FIG. 7B show a step of loading multiple unit fuel cells onto inclined lower guide plates 82, 82 (inclined stage) in a stacked state in a fuel cell manufacturing method.

In FIG. 7A, by the drive motor 101 of the pusher moving means 59 rotating forward, the ball screw 96 is rotated forward via the small-diameter pulley 99, the belt 98 and the large-diameter pulley 97. Consequently, the moving body 93 moves forward along the pusher beam part 55 as shown by the arrow a.

At the point when the holding part 94 of the moving body 93 has moved as far as the position of the front end of the pusher beam part 55 (see FIG. 7B), the drive motor 101 stops. The holding part 94 comes to rest at the front end position of the pusher beam part 55.

When the cylinder rod 182 of the guide cylinder 181 provided on the left guide part 84 of the guide means 57 retracts, the left rocking part 91 rocks about the pin 176 as shown by the arrow b. Consequently, the left guide plate 87 moves from its support position to its withdrawn position.

The cylinder rod 169 of the locking cylinder 168 provided on the pusher unit locking means 105 descends as shown by the arrow c. Consequently, the retaining portion 163a of the retaining member 163 shown in FIG. 6 moves to its withdrawn position away from the upper face of the lock pin 109, and its state of locking with the lock pin 109 is released.

When the drive motor 77 of the pusher beam pivoting part 56 is driven, it swings the pusher beam part 55 from the horizontal position P2 to the upward-pointing position P1 (the position shown in FIG. 7B) as shown by the arrow d.

The upward-pointing position P1 shown in FIG. 7B is a state such that the pusher beam part 55 is inclined at an angle, and the pusher beam part 55 having the lower guide plates 82, 82 constitutes an inclined stage.

When the cylinder rods 149, 149 (see FIG. 4) of the left and right second holding cylinders 148, 148 on the receiver part 61 retract, the left and right retaining claws 151, 151 (see FIG. 4) move away from each other.

Then, when the cylinder rods 146, 146 of the left and right first holding cylinders 145, 145 (in this FIG. 7A, only the first holding cylinder 145 and cylinder rod 146 on the left side are shown) retract, the left and right retaining claws 151, 151 (see FIG. 4 for the retaining claw 151 on the far side) retract as shown by the arrow e.

When the cylinder rod 122 of the receiver pivoting part 62 retracts, the receiver part 61 swings as shown by the arrow f about the mounting pin 115 to the upward-pointing position P3 (see FIG. 7B) in which it supports a second support plate 15.

Next, as shown in FIG. 7B, a second support plate 15 is placed on the holding part 138 of the receiver part 61 as shown by the arrow g.

When the cylinder rods 146, 146 of the left and right first holding cylinders 145, 145 (of which only the first holding cylinder 145 and cylinder rod 146 on the near side are shown) advance, the left and right retaining claws 151, 151 (see FIG. 4 for the retaining claw 151 on the far side) advance as shown by the arrow h.

Then, when the cylinder rods 149, 149 (see FIG. 4) of the left and right second holding cylinders 148, 148 advance, the left and right retaining claws 151, 151 move toward each other. Consequently, the bent-over portions 151a, 151a (see FIG. 4) of the left and right retaining claws 151, 151 make contact with the rear face 15e of the second support plate 15.

And the second support plate 15 is held by the bent-over portions 151a, 151a and the holding part 138.

After the holding of the second support plate 15 is complete, or simultaneously with the holding of the second support plate 15, a first supporting plate 14 is placed on the holding part 94 of the pusher unit 52 as shown by the arrow i.

Then, multiple unit fuel cells 11 are successively loaded onto the first supporting plate 14 as shown by the arrow j. In this way, multiple unit fuel cells 11 are stacked on the holding part 94 along the lower guide plates 82, 82 of the inclined pusher beam part 55.

As a result of the pusher beam part 55 being constructed swingably between an upward-pointing position P1 and a horizontal position P2 like this, when the pusher beam part 55 is in the upward-pointing position P1 it is possible for a first supporting plate 14 and multiple unit fuel cells 11 to be stacked in turn from above onto the holding part 94. Thus it is possible to stack the multiple unit fuel cells 11 onto the first supporting plate 14 easily.

When the first supporting plate 14 is placed on the holding part 94, the holding part 94 is positioned in a setting position P9 at the end of the pusher beam part 55.

Each time a first supporting plate 14 and unit fuel cells 11 are loaded onto the holding part 94, the holding part 94 is lowered by the drive motor 101 as shown by the arrow k. When a first supporting plate 14 is loaded onto the holding part 94, the rear face 14e (see FIG. 1) of the first supporting plate 14 comes to the setting position P9. And when a unit fuel cell 11 is then loaded on the first supporting plate 14, the upper face 11e of the unit fuel cell 11 comes to the setting position P9.

Accordingly, the loading faces of the first supporting plate 14 and the multiple unit fuel cells 11 are kept at the setting position P9 at the same height at all times, and it becomes possible to supply the first supporting plate 14 and the multiple unit fuel cells 11 from a constant height at all times. As a result, when the supplying of the first supporting plate 14 and the multiple unit fuel cells 11 is carried out by hand, the burden on the worker is lightened.

When on the other hand the supplying of the first supporting plate 14 and the multiple unit fuel cells 11 is automated for example with a robot, the control of the robot can be made simple.

Figure 8A:
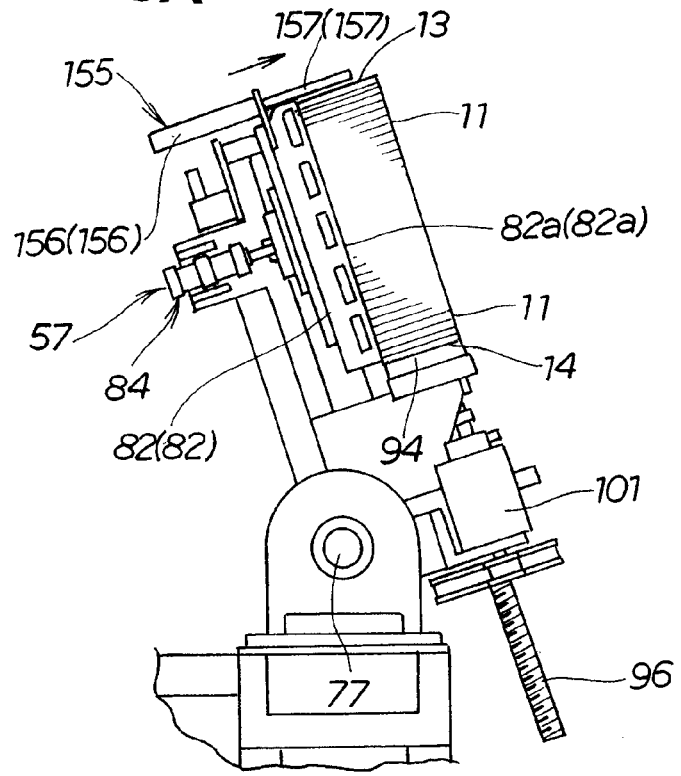
FIG. 8A and FIG. 8B are views showing a step of supporting the bottom sides and right sides of unit fuel cells.
Figure 8B:
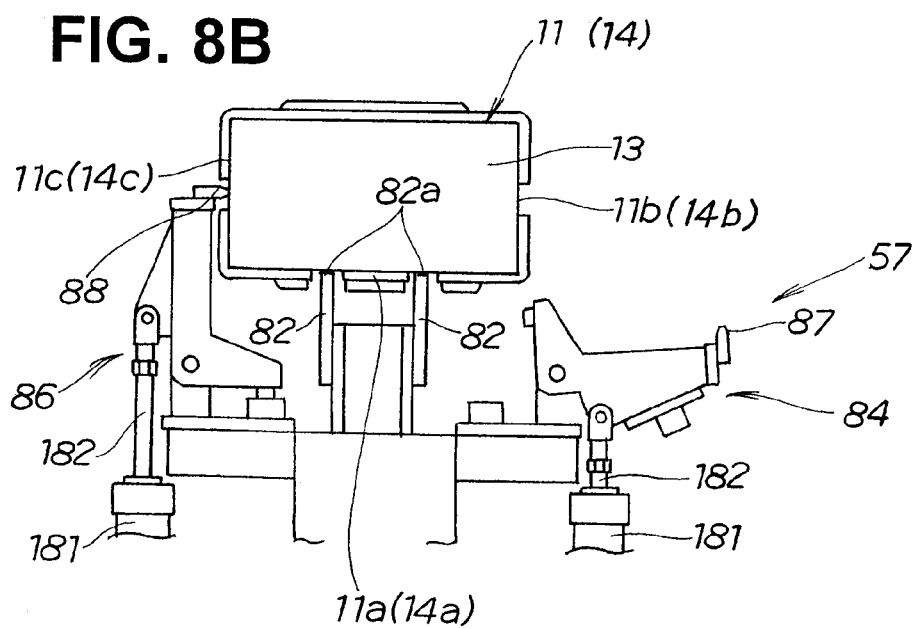

FIG. 8A and FIG. 8B show a step of supporting the bottom sides and the right sides of multiple stacked unit fuel cells.

In FIG. 8A, when the cylinder rods 157, 157 of the left and right fall prevention cylinders 156, 156 of the fall prevention means 155 advance as shown with an arrow and project upward of the top sides 82a, 82a of the left and right lower guide plates 82, 82, dropping off of the multiple unit fuel cells 11 supported on the left and right lower guide plates 82, 82 from the ends of the left and right lower guide plates 82, 82 and tipping over of the multiple unit fuel cells 11 are prevented.

In FIG. 8B, the left and right lower guide plates 82, 82 support the bottom side 14a of the first supporting plate 14 and the bottom sides 11a . . . of the multiple unit fuel cells 11.

Also, the right guide plate 88 supports the right side 14c of the first supporting plate 14 and the right sides 11c of the multiple unit fuel cells 11 supported by the left and right lower guide plates 82, 82.

Figure 9A:
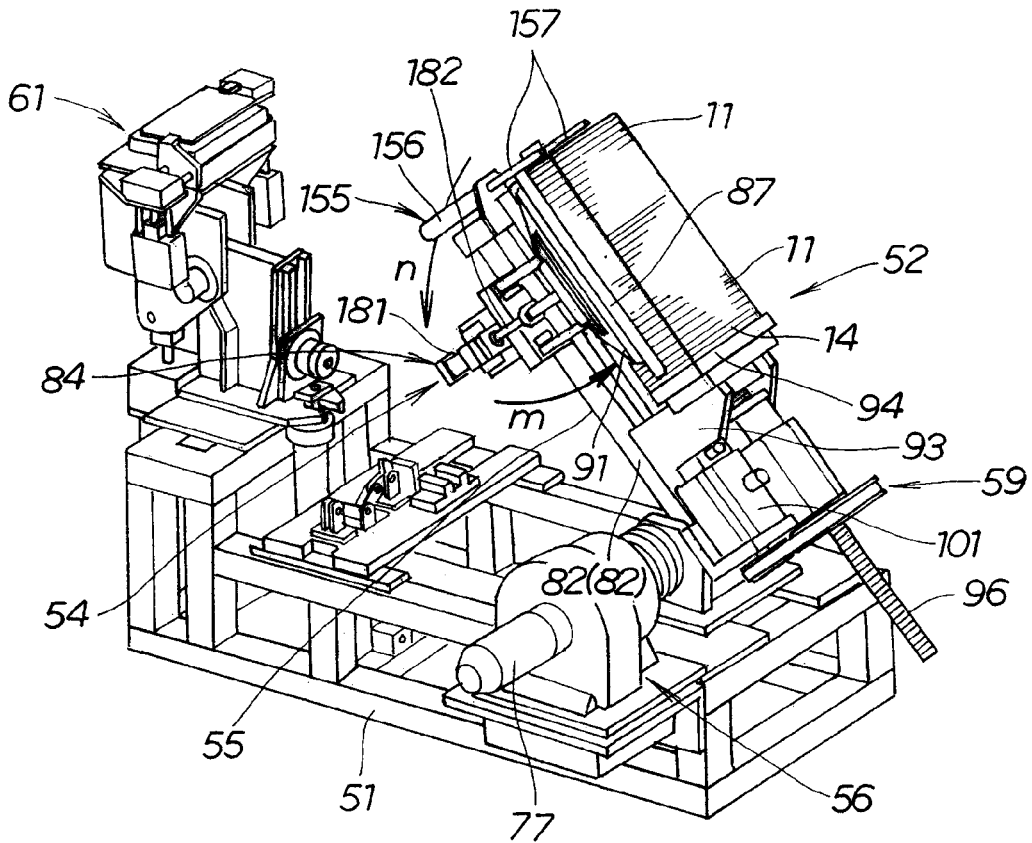
FIG. 9A and FIG. 9B are views showing a step of supporting a bottom side and left and right sides of a unit fuel cell.
Figure 9B:
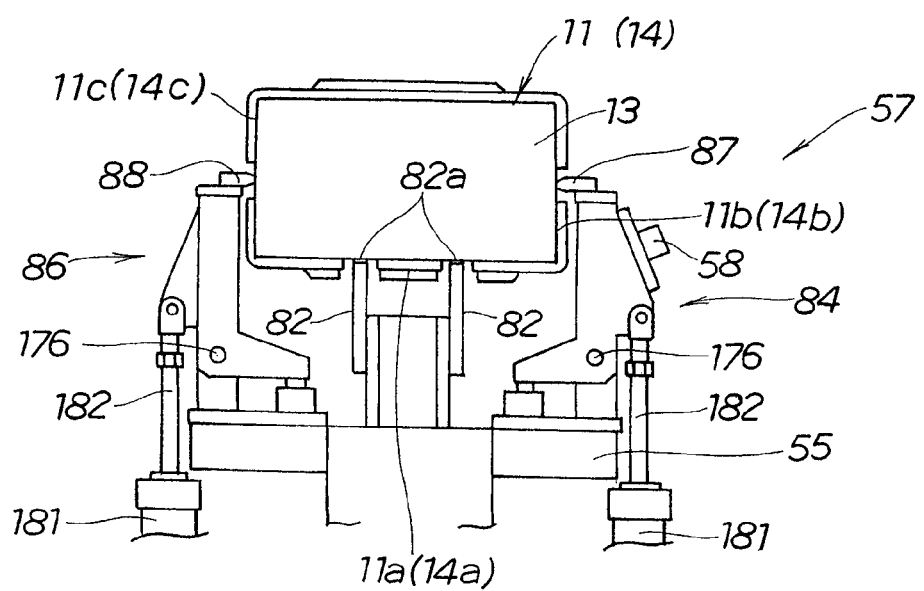

FIG. 9A and FIG. 9B show a step of supporting the bottom sides and the left and right sides of unit fuel cells.

In FIG. 9A, when the cylinder rod 182 of the guide cylinder 181 in the left guide part 84 advances, the left rocking part 91 swings about the pin 176 (see FIG. 9B) as shown by the arrow m.

In FIG. 9B, the left and right lower guide plates 82, 82 support the bottom side 14a of the first supporting plate 14 and the bottom sides ha of the multiple unit fuel cells 11.

The left guide plate 87 supports the left side 14b of the first supporting plate 14 and the left sides 11b of the multiple unit fuel cells 11.

By the guide means 57 slidably supporting three sides of the first supporting plate 14 (the bottom side 14a and the left and right sides 14b, 14c) and three sides of the multiple unit fuel cells 11 (the bottom sides 11a and the left and right sides 11b, 11c) like this, the bottom sides 11a and the left and right sides 11b, 11c of the loaded unit fuel cells 11 are brought into line and the multiple unit fuel cells 11 are aligned.

Next, by the drive motor 77 of the pusher beam pivoting part 56 shown in FIG. 9A being driven, the pusher beam part 55 is moved from the upward-pointing position P1 (see FIG. 7B) to the horizontal position P2 (see FIG. 7A) as shown by the arrow n.

Figure 10A:
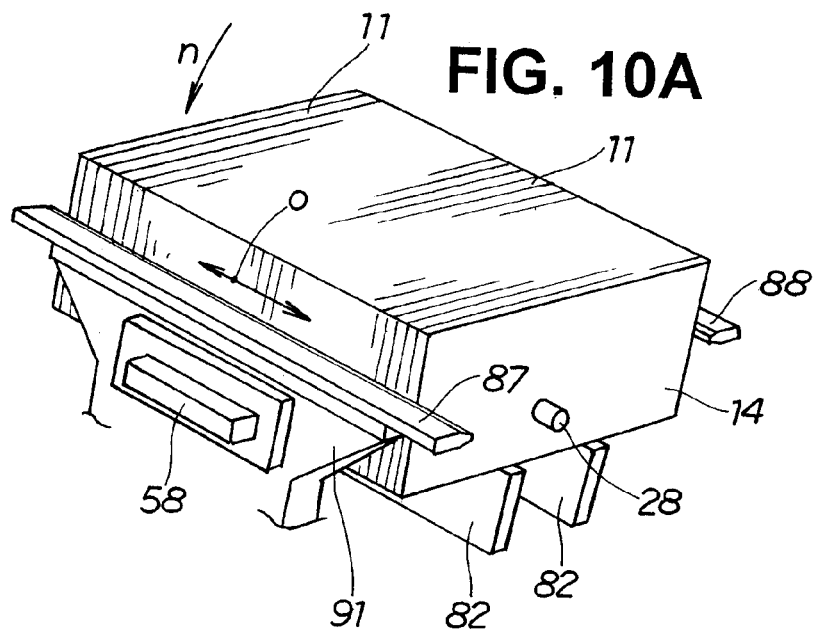
FIG. 10A to FIG. 10C are views showing a step of aligning multiple unit fuel cells.
Figure 10B:
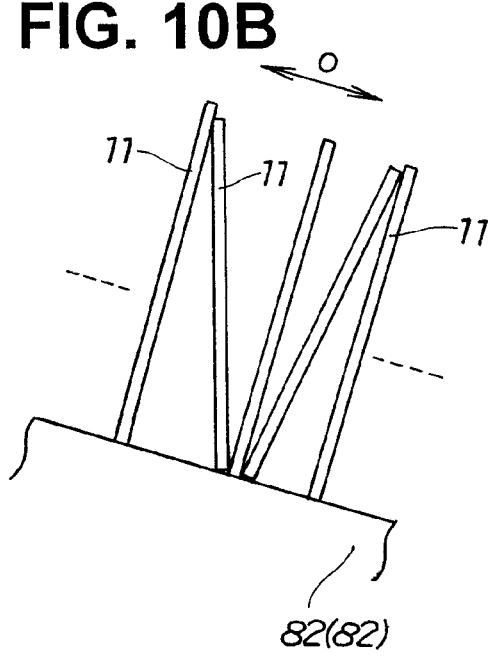
Figure 10C:
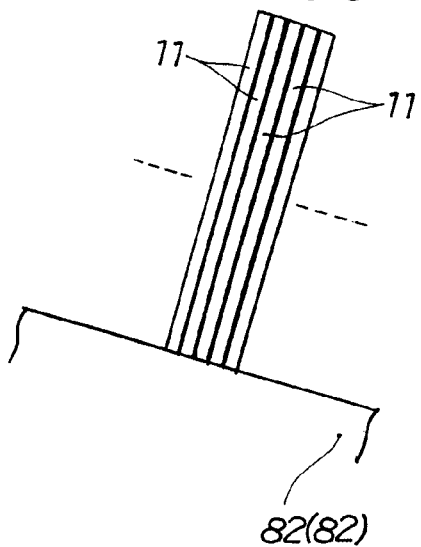

FIG. 10A to FIG. 10C show a step of aligning the multiple unit fuel cells.

In FIG. 10A, the pusher beam part 55 (see FIG. 9A) swings as shown by the arrow n and the vibrating means 58 is operated. By the operation of the vibrating means 58, the left guide plate 87 mounted on the top of the left rocking part 91 vibrates as shown by the arrow o. When the left guide plate 87 vibrates in the length direction of the pusher beam part 55 as shown by the arrow o, the multiple unit fuel cells 11 vibrate in the length direction of the pusher beam part 55 as shown by the arrow o.

In FIG. 10B, when multiple unit fuel cells 11 are placed successively on the holding part 94 of the pusher unit 52 as shown in FIG. 7B, it is possible that some of the multiple unit fuel cells 11 will be loaded at an angle. The multiple unit fuel cells 11 in this state are vibrated by the vibrating means 58 as shown by the arrow o, which is the length direction of the pusher beam part 55 shown in FIG. 7B.

As shown in FIG. 10C, as a result of the multiple unit fuel cells 11 being vibrated as shown by the arrow o in the length direction of the pusher beam part 55, the individual unit fuel cells 11 line up in parallel with each other.

Here, as the multiple unit fuel cells 11 are loaded onto the holding part 94 of the pusher unit 52 as shown in FIG. 9A, the lower guide plates 82, 82 are inclined. Because of this, the multiple unit fuel cells 11 can be piled up on the holding part 94. Consequently, on each of the unit fuel cells 11 the weight of the stacked unit fuel cells 11 above it acts, and there is a risk of the multiple unit fuel cells 11 becoming stuck to each other (that is, of a frictional force due to the contact between them arising).

When the unit fuel cells 11 are stuck to each other like this, even when a vibration is applied to the unit fuel cells 11, it is difficult to align the unit fuel cells 11 with the vibrating action.

To avoid this, in this preferred embodiment, by the pusher beam part 55 being made to swing from the upward-pointing position P1 (see FIG. 7B) to the horizontal position P2 (see FIG. 7A) as shown by the arrow n as the vibrating action is employed, the stuck state of the multiple unit fuel cells 11 is released, and then by the vibration being applied to these unit fuel cells 11 the multiple unit fuel cells 11 are brought into line.

While the pusher beam part 55 is swinging from the upward-pointing position P1 to the horizontal position P2, the alignment of the multiple unit fuel cells 11 is increased by the vibrating action. Therefore, when the multiple unit fuel cells 11 shown in FIG. 9B are being loaded onto the lower guide plates 82, 82, the multiple unit fuel cells 11 can be placed on the lower guide plates (inclined stage) 82, 82 of the pusher beam part 55 relatively roughly. Consequently it is possible to load multiple unit fuel cells 11 onto the left and right lower guide plates (inclined stage) 82, 82 with little labor in a short time.

After the multiple unit fuel cells 11 have been aligned well by the vibrating action while the pusher beam part 55 shown in FIG. 9A is moving from the upward-pointing position P1 (see FIG. 7B) to the horizontal position P2 (see FIG. 7A), the multiple unit fuel cells 11 are pressed against the cylinder rods 157, 157 of the fall prevention means 155.

Specifically, after the multiple unit fuel cells 11 have been aligned well by the vibrating action, by the drive motor 101 of the pusher moving means 59 being rotated forward and the ball screw 96 thereby being rotated forward, the moving body 93 and the holding part 94 are moved toward the distal end of the pusher beam part 55, that is, the cylinder rods 157, 157 of the fall prevention means 155.

Thus the holding part 94 causes the front end of the multiple unit fuel cells 11 to abut with the cylinder rods 157, 157 of the fall prevention means 155. Consequently, when the pusher beam part 55 has reached the horizontal position P2 (see FIG. 7A), the aligned multiple unit fuel cells 11 are kept well in their aligned state so that they do not fall over.

When the front end of the multiple unit fuel cells 11 has abutted with the cylinder rods 157, 157, the drive motor 101 stops.

Figure 11B:
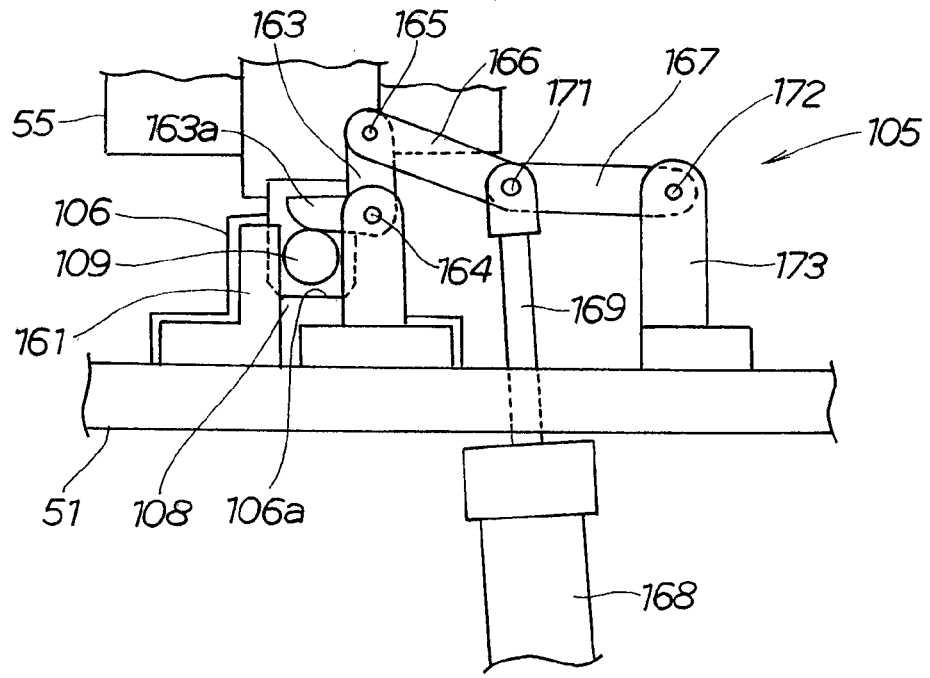

FIG. 11A and FIG. 11B show a step of locking the pusher unit in its horizontal position.

As shown in FIG. 11A, the pusher beam part 55 swings as shown by the arrow n and arrives at its horizontal position P2 (see FIG. 7A). At this time, the positioning projection 108 fits in the slot 106a in the receiving part 106 mounted on the bed structure 51 as shown by the arrow p. And the pusher beam part 55 is thereby positioned in the horizontal position P2.

At this time, the lock pin 109 descends along the guide member 161 of the pusher unit locking means 105. In this state, the cylinder rod 169 of the locking cylinder 168 of the pusher unit locking means 105 advances as shown by the arrow q. And consequently, the retaining member 163 turns counterclockwise about the pin 164.

As shown in FIG. 11B, the retaining portion 163a of the retaining member 163 assumes its locking position on the upper face of the lock pin 109. As a result, the lock pin 109 is prevented from moving upward and kept in a locked state by the retaining portion 163a.

Figure 12:
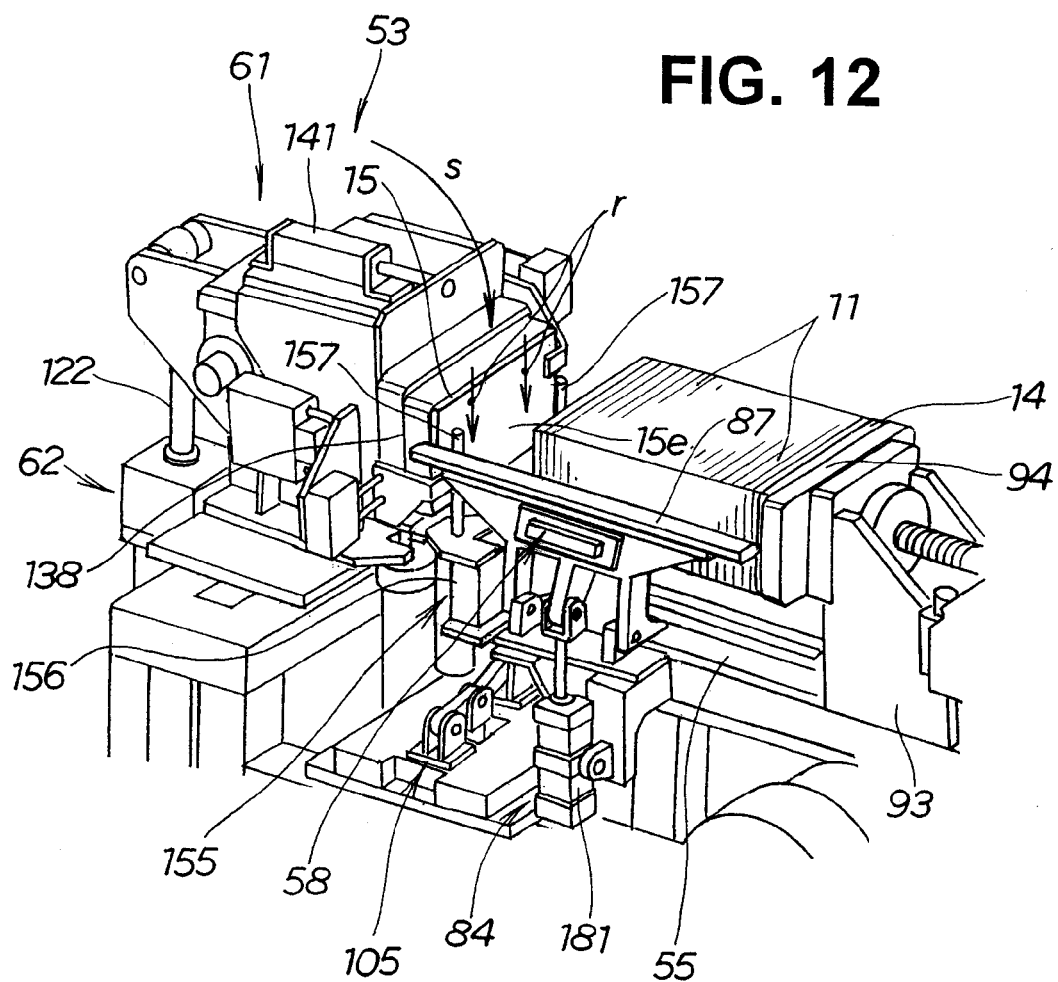
FIG. 12 is a view showing a step in which a cylinder rod of a fall prevention cylinder descends.

FIG. 12 shows a step of the cylinder rods 157 of the fall prevention cylinders 156 descending. In FIG. 12, to facilitate understanding of the fall prevention means 155, for the description the front end of the unit fuel cells 11 abutting with the cylinder rods 157, 157 of the fall prevention means 155 is not shown.

When the pusher beam part 55 has become positioned in its horizontal position P2 (the position shown in the figure), the vibrating means 58 stops its operation.

Next, the cylinder rods 157, 157 of the left and right fall prevention cylinders 156, 156 (of which the fall prevention cylinder 156 on the far side is not shown) of the fall prevention means 155 descend as shown by the arrows r.

Then, the cylinder rod 122 of the receiver pivoting part 62 of the receiver unit 53 advances and the receiver part 61 swings to the horizontal position P4 (the position shown in the figure) as shown by the arrow s.

FIG. 13 shows a step of disposing the load cell 129 in the measurement position P6.

By the receiver part 61 being disposed in its horizontal position P4, the second support plate 15 is placed at the ends of the left and right lower guide plates 82, 82.

Next, when the cylinder rod 132 of the lifting cylinder 131 of the pressing force measuring means 63 ascends as shown by the arrow t, together with the ascending/descending cylinder 128 the load cell 129 ascends to the measurement position P6. In this state, by the drive motor 101 of the pusher moving means 59 being rotated forward and rotating the ball screw 96 forward, the moving body 93 is moved forward along the pusher beam part 55 as shown by the arrow u.

Figure 14:
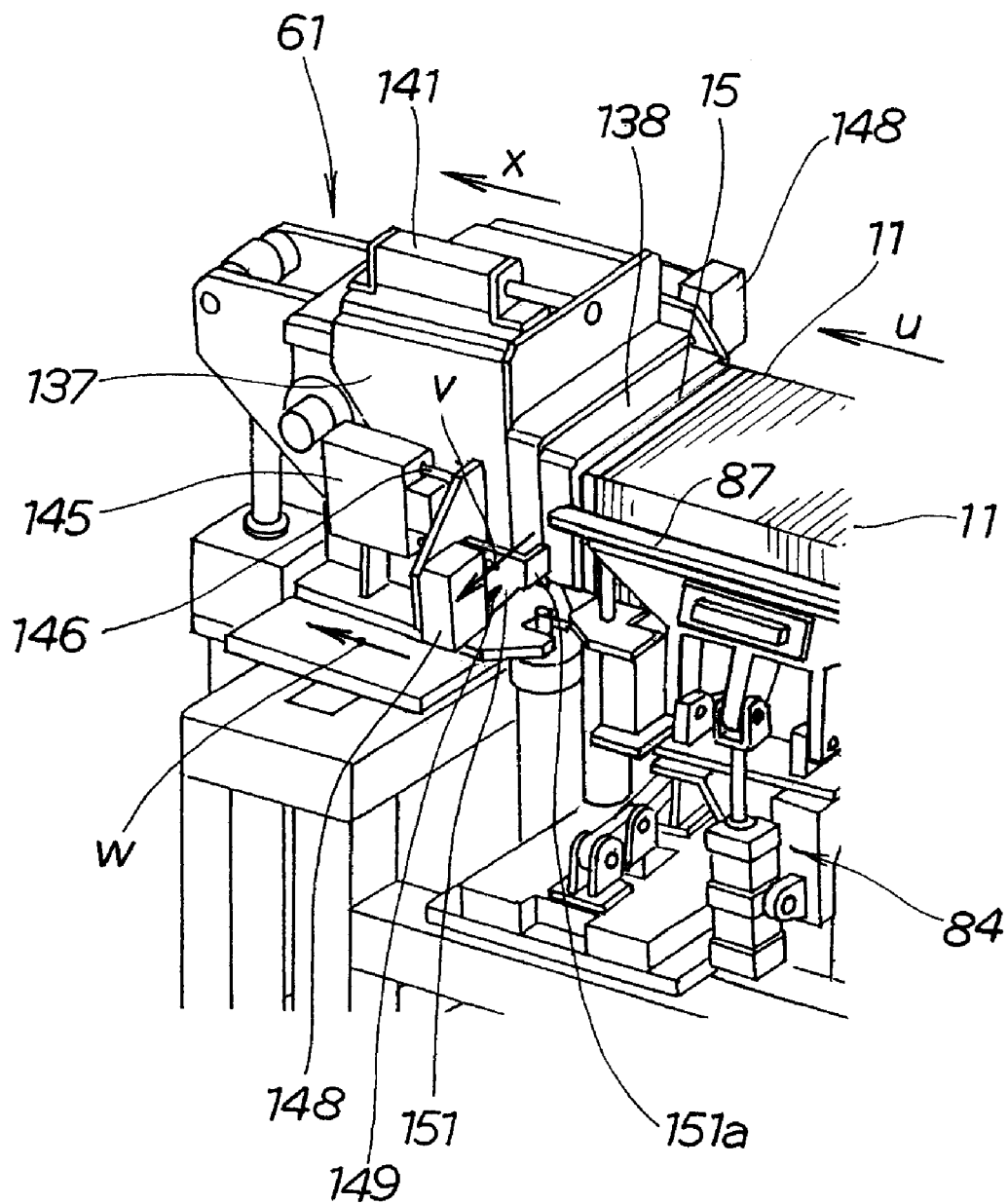
FIG. 14 is a view showing a step of placing first and second support plates on the end faces of unit fuel cells.

FIG. 14 shows a step of disposing the first and second support plates at the ends of the multiple unit fuel cells 11.

When the cylinder rods 149, 149 (of which only the cylinder rod 149 on the near side is shown) of the left and right second holding cylinders 148, 148 retract, the left and right retaining claws 151, 151 (see FIG. 4 for the retaining claw 151 on the far side) move away from each other as shown by the arrow v. Consequently, the holding of the second support plate 15 by the left and right retaining claws 151, 151 is released.

Then, when the cylinder rods 146, 146 (of which the first holding cylinder 145 and the cylinder rod 146 on the far side are not shown) of the left and right first holding cylinders 145, 145 retract, the left and right retaining claws 151, 151 retract as shown by the arrow w.

Here, the moving body 93 is moving continuously forward along the pusher beam part 55 (see FIG. 13) as shown by the arrow u.

Consequently, the bent-over portions 151a, 151a (see FIG. 4 for the bent-over portion 151a on the far side) of the left and right retaining claws 151, 151 move away from the rear face 15e (see FIG. 13) of the second support plate 15.

When the holding of the second support plate 15 by the left and right bent-over portions 151a, 151a has been released like this, the front end face 13 (see FIG. 9B) of the stacked multiple unit fuel cells 11 abuts with the rear face 15e (see FIG. 13) of the second support plate 15. At this time, the moving cylinder 141 is switched to free.

By this means, the first and second support plates 14, 15 are respectively disposed at the end faces (ends) 12, 13 of the aligned multiple unit fuel cells 11.

After the front end face 13 of the stacked unit fuel cells 11 has abutted with the rear face 15e of the second support plate 15, the moving body 93 moves continuously forward along the pusher beam part 55 (see FIG. 13) as shown by the arrow u.

The second support plate 15, the holding part 138 and the moving body 137 retreat as shown by the arrow x and the moving body 137 abuts with the distal end of the load cell 129 (see FIG. 13) of the pressing force measuring means 63.

The load cell 129 measures the pressing force F with which the multiple unit fuel cells 11 are pressed by the pusher moving means 59 (see FIG. 13). By using the load cell 129 to measure the pressing force F, it becomes possible to measure a predetermined pressing force F3 relatively simply and with good accuracy, and it is possible to apply a predetermined pressing force F3 to the unit fuel cells 11 simply. That is, the stacked unit fuel cells 11 are pressed with the pusher moving means 59 until the measured value F of the load cell 129 reaches a predetermined pressing force F3.

Figure 15A:
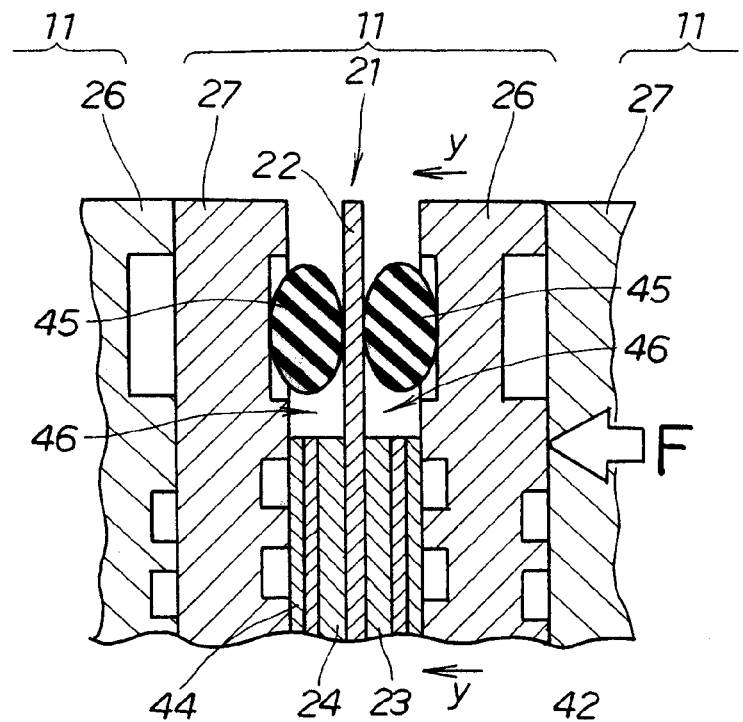
FIG. 15A and FIG. 15B are views showing a step of applying a predetermined pressing force to multiple unit fuel cells in a stack.
Figure 15B:
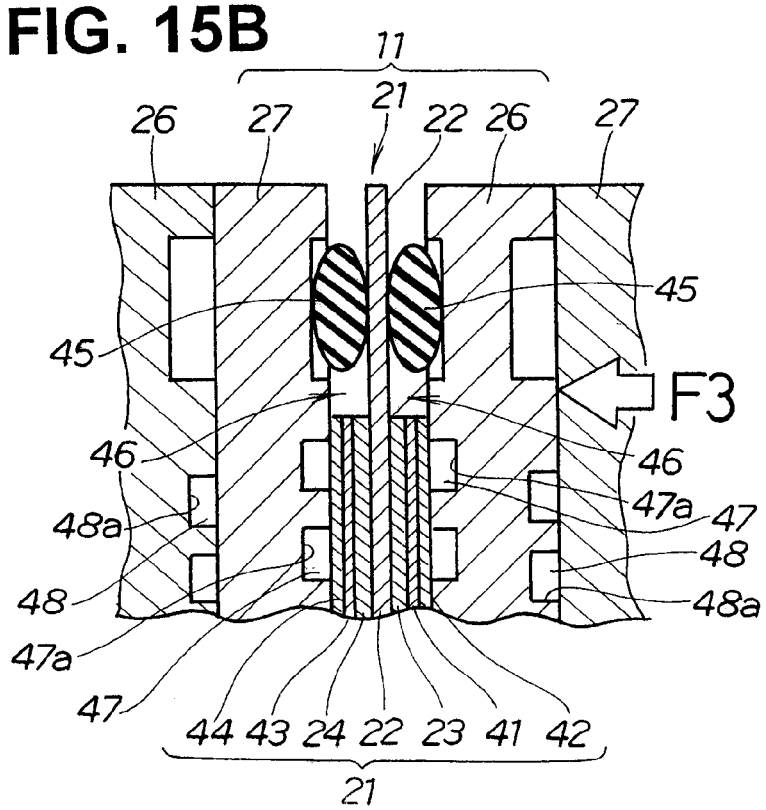

FIG. 15A and FIG. 15B show a step of applying a predetermined pressing force to the multiple unit fuel cells 11.

In FIG. 15A, as a result of the stacked multiple unit fuel cells 11 being pushed with the pusher moving means 59 (see FIG. 13), a pressing force F acts on the multiple unit fuel cells 11 as shown by the arrow. And as a result of the pressing force F acting on the multiple unit fuel cells 11, the separator 26 moves in parallel as shown by the arrow y.

In FIG. 15B, when the pressing force F rises to a predetermined pressing force F3, the predetermined pressing force F3 acts on the multiple unit fuel cells 11 through the first and second support plates 14, 15 (see FIG. 13). Consequently, the gaps 46, 46 between the separators 26, 27 become small and the liquid seals 45 are compressed and block the gaps 46, 46 between the separators 26, 27 and the electrolyte membrane 22. At the same time, by the separators 26, 27 being pressed against the sides of the membrane electrode structure 21, the openings of the gas supply channels 47a formed in the separators 26, 27 are closed by the positive and negative diffusion layers 42, 44 and flow passages 47 are formed.

Also, by the separator 27 adjacent to the separator 26, the openings of the water discharge channels 48a formed in the separator 26 are closed and flow passages 48 are formed.

Figure 16:
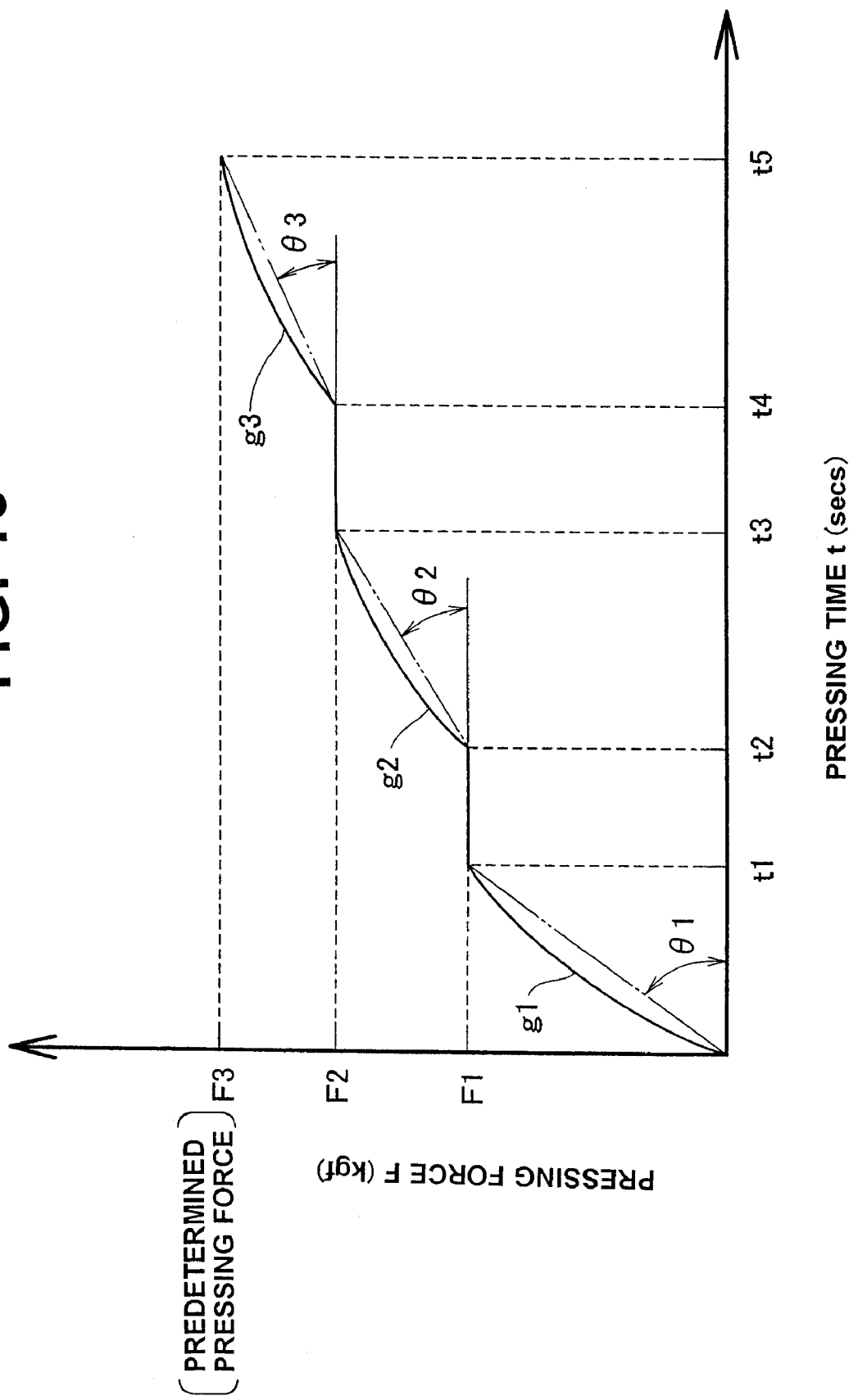
FIG. 16 is a graph showing a pressing force applied in stages when a predetermined pressing force is applied to multiple unit fuel cells in a stack.

FIG. 16 shows a graph relating to the pressing force on the stacked multiple unit fuel cells 11. The vertical axis is pressing force F (kgf) and the horizontal axis is pressing time t (seconds).

On the basis of this graph, an example of a pressing force F pushing against multiple unit fuel cells 11 until it reaches a predetermined pressing force F3 will be described.

First, the pressing force F is gradually increased along a curve g1 of slope angle θ1 so that the pressing force F reaches F1 when the pressing time t is t1.

When the pressing force F reaches F1, the pressing force F is kept constant at F1 until the pressing time t reaches t2 seconds.

After the pressing time t reaches t2, the pressing force F is gradually increased along a curve g2 of slope angle θ2 so that the pressing force F reaches F2 when the pressing time t is t3.

When the pressing force F reaches F2, the pressing force F is kept constant at F2 until the pressing time t reaches t4 seconds.

After the pressing time t reaches t4, the pressing force F is gradually increased along a curve g3 of slope angle θ3 so that the pressing force F reaches the predetermined pressing force F3 when the pressing time t is t5.

In this way, the pressing force F applied to the multiple unit fuel cells 11 is increased to the predetermined pressing force F3 in stages. By this means, when the predetermined pressing force F3 is applied to the multiple unit fuel cells 11, the pressing force F3 is prevented from concentrating locally with respect to the liquid seals 45 (see FIG. 15B), and the pressing force is also prevented from concentrating locally with respect to the positive and negative diffusion layers 42, 44 making contact with the separators 26, 27 shown in FIG. 15B.

Because for example porous carbon paper is used for the positive and negative diffusion layers 42, 44, if the pressing force concentrates locally on the diffusion layers 42, 44 it is conceivable that the diffusion layers 42, 44 will suffer damage.

However, with this preferred embodiment, because the pressing force is prevented from concentrating locally on the diffusion layers 42, 44, there is no damaging of the diffusion layers 42, 44.

Here, the slope angle θ1 of the curve g1, the slope angle θ2 of the curve g2 and the slope angle θ3 of the curve g3 have the relationship θ1>θ2>θ3. Therefore, the rate of increase of the pressing force F is smaller on the curve g2 compared to the curve g1 and is smaller on the curve g3 compared to the curve g2.

Consequently, the pressing force F is increased more slowly as it approaches the predetermined pressing force F3, the pressing force is more certainly prevented from concentrating locally on the seals, and the pressing force is more certainly prevented from concentrating locally on the positive and negative diffusion layers in contact with the separators.

Figure 17A:
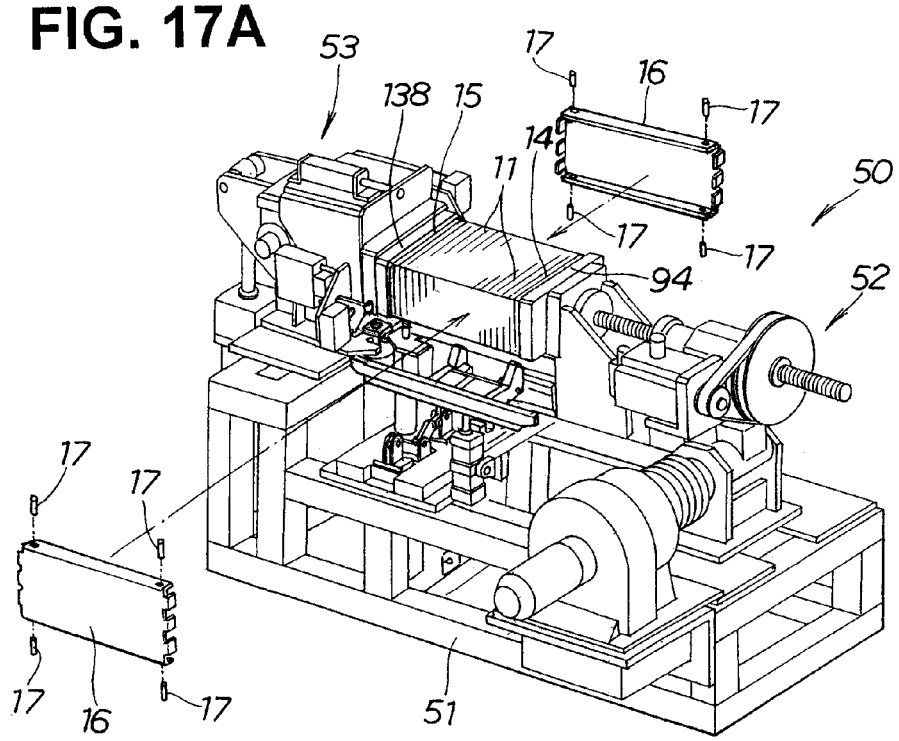
FIG. 17A and FIG. 17B are views showing a step of connecting first and second support plates with connection plates.
Figure 17B:
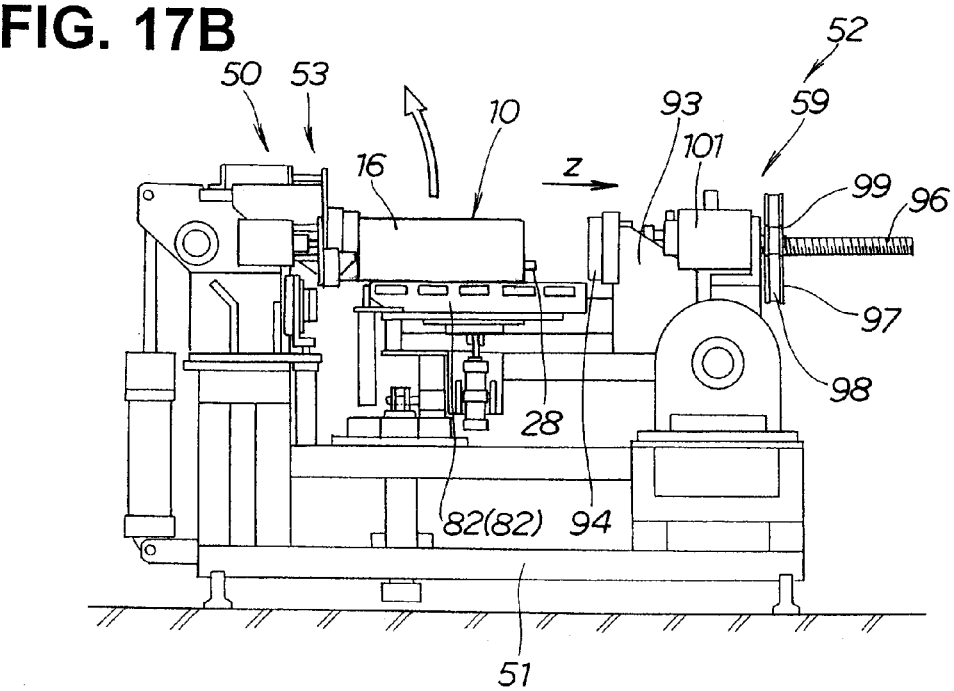

FIG. 17A and FIG. 17B show a step of connecting the first and second support plates 14, 15 with the left and right connection plates 16, 16.

In FIG. 17A, with the multiple unit fuel cells 11 being pressed with the predetermined pressing force F3, the left and right connection plates 16, 16 are fixed to the first and second support plates 14, 15 with the multiple pins 17. By this means the multiple unit fuel cells 11 and the first and second support plates 14, 15 are connected together integrally with the left and right connection plates 16, 16.

As shown in FIG. 17B, by the first and second support plates 14, 15 being connected together by means of the connection plates 16, 16 with the predetermined pressing force F3 applied to the multiple unit fuel cells 11, a fuel cell 10 is obtained.

After that, by the drive motor 101 of the pusher moving means 59 being rotated backward and the ball screw 96 being rotated backward via the small-diameter pulley 99, the belt 98 and the large-diameter pulley 97, the moving body 93 and the holding part 94 are withdrawn as shown by the arrow z.

After the moving body 93 and the holding part 94 are withdrawn, the fuel cell 10 is taken out of the manufacturing apparatus 50 as shown by the arrow.

As has been described on the basis of FIG. 7A through FIG. 17B, in this invention, when manufacturing a fuel cell 10 using a fuel cell manufacturing apparatus 50, by multiple unit fuel cells 11 being stacked on a first supporting plate 14, and the multiple unit fuel cells 11 also being loaded roughly onto left and right lower guide plates 82, 82, and then a predetermined pressing force F3 being applied to the multiple unit fuel cells 11, a fuel cell 10 in which the multiple unit fuel cells 11 are aligned is obtained.

Figure 18:
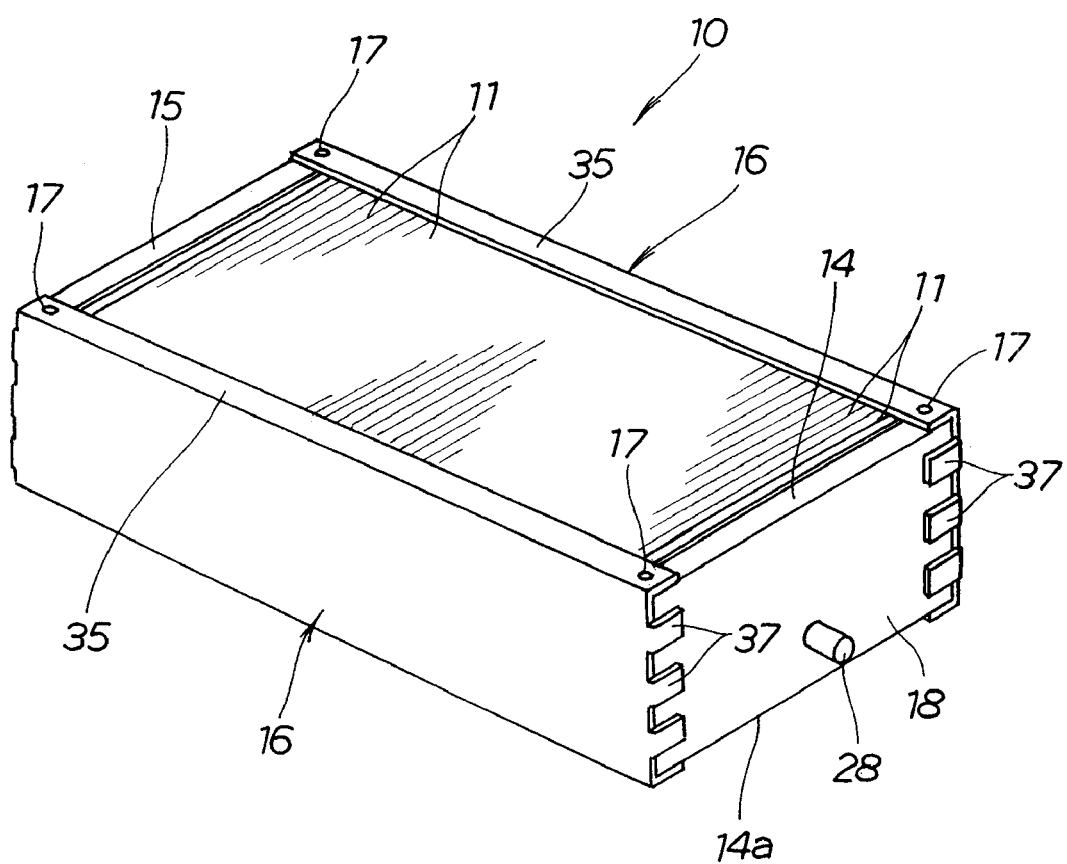
FIG. 18 is a perspective view showing a fuel cell 10 manufactured by a fuel cell manufacturing method according to the invention.
Figure 19:
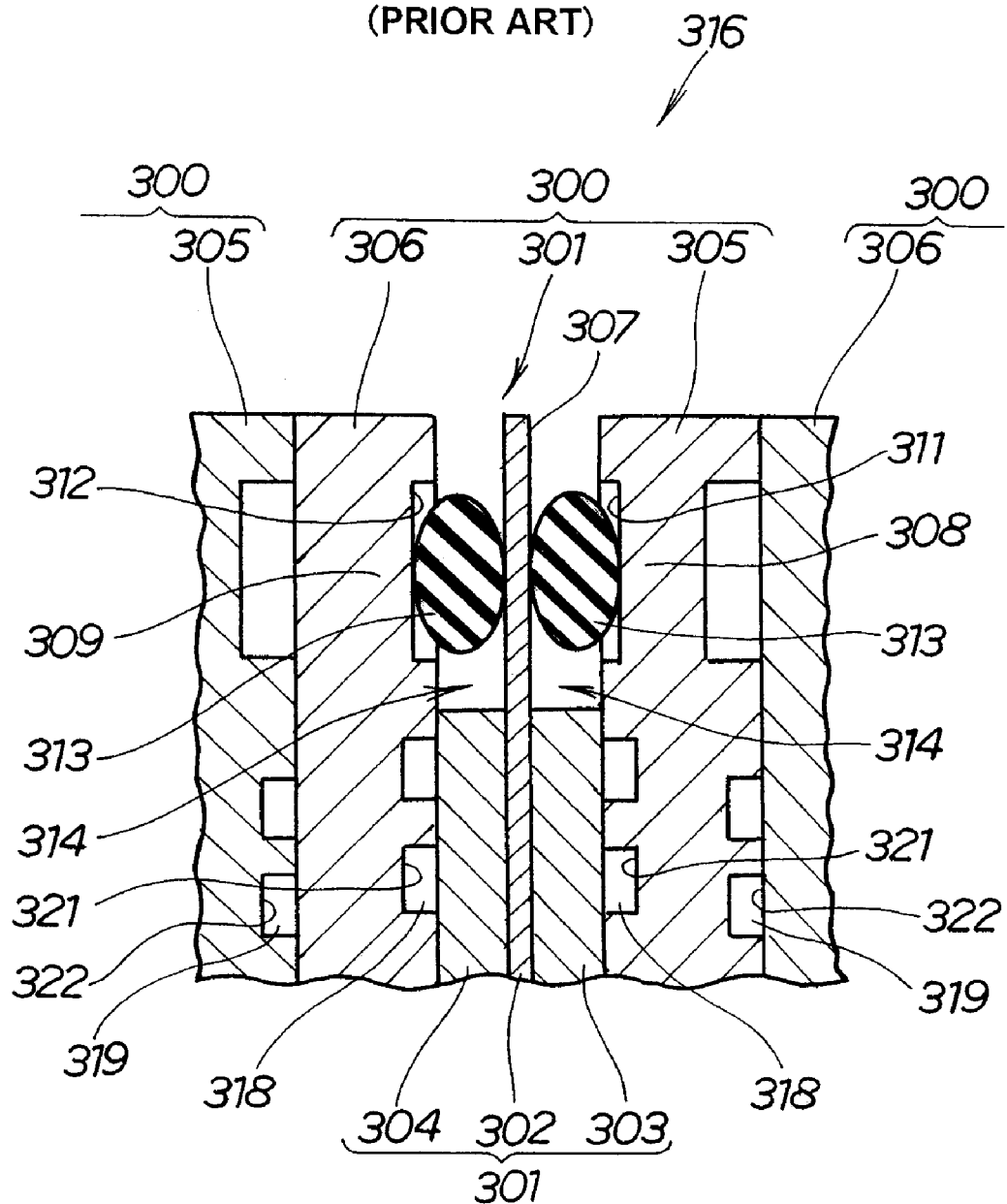
FIG. 19 is a sectional view illustrating the basic arrangement of a conventional unit fuel cell.

FIG. 18 shows a fuel cell 10 manufactured using the fuel cell manufacturing method of the invention.

This fuel cell 10 has a construction in which first and second support plates 14, 15 are disposed at the end faces 12, 13 (see FIG. 1) of stacked multiple unit fuel cells 11, and by left and right connection plates 16, 16 being connected to the first and second support plates 14, 15 with multiple pins 17 the multiple unit fuel cells 11 and the first and second support plates 14, 15 are connected together integrally.

Although in this preferred embodiment an example has been described in which the connection members connecting together the first and second support plates 14, 15 of the fuel cell 10 are connection plates 16, the connection members are not limited to this and ones of some other shape such as connecting rods may be selected.

Also, although in this preferred embodiment an example has been described in which the vibrating means 58 was mounted on the left guide part 84 of the guide means 57, there is no limitation to this, and alternatively the vibrating means 58 may be mounted on the right guide part 86 of the guide means 57 or one may be mounted on each of the guide parts 84, 86.

Although in this preferred embodiment an example has been described in which the vibrating means 58 was made to vibrate in the horizontal direction to bring the multiple unit fuel cells 11 into alignment, the vibration direction of the vibrating means 58 is not limited to the horizontal direction, and it is also possible for it to be made to vibrate in another direction.

Also, although in this preferred embodiment an example has been described in which of the guide means 57 the left and right guide parts 84, 86 were constructed to be rockable, there is no limitation to this, and alternatively just the left guide part 84 may be made rockable and the right guide part 86 may be made a fixed construction.

Although in this preferred embodiment an example has been described in which the pressing force F with which the multiple unit fuel cells 11 are pressed is increased to the predetermined pressing force F3 gradually in the three stages of the curve g1, the curve g2 and the curve g3 as shown in the graph of FIG. 16, there is no limitation to this, and alternatively the pressing force F may be increased gradually until it reaches the predetermined pressing force F3 in two stages, four stages or some other plurality of stages.

Whereas in this preferred embodiment an example has been described in which when the receiver part 61 is disposed in the horizontal position P4 the second support plate 15 is placed at the end of the left and right lower guide plates 82, 82, there is no limitation to this, and alternatively the second support plate 15 may not be placed at the end of the left and right lower guide plates 82, 82 when the receiver part 61 is disposed in the horizontal position P4.

INDUSTRIAL APPLICABILITY

As has been described above, with the fuel cell manufacturing method of the invention, the work of stacking multiple unit fuel cells to constitute a fuel cell is untroublesome, fuel cell productivity increases and consequently they become cheaper, and the invention is useful to the fuel cell manufacturing industry.

The invention claimed is:

1. A fuel cell manufacturing method for obtaining a fuel cell by manufacturing unit fuel cells, by providing positive and negative electrodes on sides of an electrolyte membrane and providing separators on outer faces of said positive and negative electrodes, and stacking together a multiple of such unit fuel cells, said method comprising the steps of:
    loading multiple unit fuel cells onto a leaning inclined stage in a stacked state;
    supporting left and right sides of the stacked multiple unit fuel cells;
    aligning the multiple unit fuel cells with a vibrating action while lowering the inclined stage to a horizontal position;
    disposing first and second support plates on end faces of the aligned multiple unit fuel cells;
    applying a predetermined pressing force to the multiple unit fuel cells via the first and second support plates; and
    connecting the first and second support plates together with connection members while applying the predetermined pressing force to the multiple unit fuel cells.

2. The fuel cell manufacturing method of claim 1, wherein, during the pressing force applying step, the pressing force applied to the multiple unit fuel cells is raised to the predetermined pressing force in stages, and wherein a rate of increase in pressing force decreases as the pressing force approaches the predetermined pressing force.

3. An apparatus for manufacturing a fuel cell comprised of unit fuel cells, made by providing positive and negative electrodes on opposite sides of an electrolyte membrane and providing separators on outer faces of the positive and negative electrodes, first and second support plates provided on end faces of a stack of unit fuel cells made by stacking together multiple unit fuel cells, and connection members connecting together the first and second support plates, comprising:
    a pusher beam part swingably mounted on a bed structure, for supporting the first support plate and the multiple unit fuel cells in a stacked state;

a pusher beam pivoting part for swinging the pusher beam part between an upward-pointing position in which the stacking of the first support plate and the multiple unit fuel cells is carried out and a horizontal position in which the connecting of the second support plate to the first support plate is carried out;

guide means provided along a length direction of the pusher beam part for slidably supporting three sides of the multiple unit fuel cells;

vibrating means for applying a vibration to the guide means to align the multiple unit fuel cells supported on the guide means;

pusher moving means for moving the first support plate and the multiple unit fuel cells along the guide means;

a receiver part, swingably provided facing the pusher beam part, for supporting the second support plate;

a receiver pivoting part for swinging the receiver part between an upward-pointing position in which the receiver part supports the second support plate and a horizontal position in which connecting of the second support plate to the first support plate is carried out; and pressing force measuring means for, when the receiver part and the pusher beam part are respectively disposed in their horizontal positions and one end face of the multiple unit fuel cells is pressed against the second support plate with the pusher moving means, measuring the pressing force acting on the second support plate.

* * * * *